(12) United States Patent
McLaughlin et al.

(10) Patent No.: US 12,527,605 B2
(45) Date of Patent: Jan. 20, 2026

(54) PLATE INSERTER INSTRUMENT

(71) Applicant: GLOBUS MEDICAL, INC., Audubon, PA (US)

(72) Inventors: Colm McLaughlin, Glenside, PA (US); Julia Gambogi, Eagleville, PA (US); Matthew Bakey, Philadelphia, PA (US); Mohammed Khan, Saddle River, NJ (US)

(73) Assignee: Globus Medical, Inc., Audubon, PA (US)

( * ) Notice: Subject to any disclaimer, the term of this patent is extended or adjusted under 35 U.S.C. 154(b) by 102 days.

(21) Appl. No.: 18/524,051

(22) Filed: Nov. 30, 2023

(65) Prior Publication Data

US 2025/0177013 A1 Jun. 5, 2025

(51) Int. Cl.
*A61B 17/16* (2006.01)
*A61B 17/70* (2006.01)

(52) U.S. Cl.
CPC ...... *A61B 17/7074* (2013.01); *A61B 17/1671* (2013.01); *A61B 17/7059* (2013.01)

(58) Field of Classification Search
CPC ............ A61B 17/1728; A61B 17/7058; A61B 17/7059; A61B 17/7076
See application file for complete search history.

(56) References Cited

U.S. PATENT DOCUMENTS

| | | | | |
|---|---|---|---|---|
| 2,338,765 A * | 1/1944 | Hartman | ................. | B23B 49/00 408/81 |
| 11,123,117 B1 * | 9/2021 | Sweeney | ............... | A61B 17/809 |
| 11,484,324 B2 * | 11/2022 | Nino | .................. | A61B 17/1604 |
| 2003/0083667 A1 * | 5/2003 | Ralph | ................. | A61B 17/1728 606/96 |
| 2012/0089192 A1 * | 4/2012 | Biedermann | ...... | A61B 17/1728 606/280 |
| 2013/0012945 A1 * | 1/2013 | Chreene | ............. | A61B 17/1728 606/80 |

\* cited by examiner

*Primary Examiner* — Nicholas W Woodall

(57) ABSTRACT

Disclosed herein are an inserter instrument, a system including the inserter, a spinal implant, and fasteners for affixing the implant to the spine of a subject, and related methods for performing spinal procedures including insertion of spinal plates. The inserter includes a housing, an inner sleeve slidably disposed within the housing, and an awl slidably disposed within the housing and inner sleeve. The housing includes a rotatable portion configured to actuate translation of the inner sleeve proximally or distally relative to the housing along a central axis to releasably engage the spinal implant using a distal engagement portion of the inner sleeve. The awl is configured to form a pilot hole in a vertebra at the surgical site, which is configured to receive a fastener to fix the spinal plate to the spine.

19 Claims, 23 Drawing Sheets

1800 ↘

```
┌─────────────────────────────────────────────────────────────────────┐
│ Coupling a knob between a handle and an outer sleeve of a housing along a │
│ longitudinal axis, 1802                                             │
└─────────────────────────────────────────────────────────────────────┘
                                    ↓
┌─────────────────────────────────────────────────────────────────────┐
│ Inserting a release pin through an aperture of the outer sleeve, 1804 │
└─────────────────────────────────────────────────────────────────────┘
                                    ↓
┌─────────────────────────────────────────────────────────────────────┐
│ Sliding an inner sleeve into a lumen of the housing through an opening in the │
│ outer sleeve, 1806                                                  │
└─────────────────────────────────────────────────────────────────────┘
                                    ↓
┌─────────────────────────────────────────────────────────────────────┐
│ Threading an external thread disposed on the inner sleeve into threaded │
│ engagement with an internal thread of the knob, 1808                │
└─────────────────────────────────────────────────────────────────────┘
                                    ↓
┌─────────────────────────────────────────────────────────────────────┐
│ Inserting a proximal engagement portion of the inner sleeve into engagement │
│ with a keyed aperture in a distal end of the handle, 1810           │
└─────────────────────────────────────────────────────────────────────┘
                                    ↓
┌─────────────────────────────────────────────────────────────────────┐
│ Inserting a lock screw through the handle into engagement with a lock button │
│ disposed within an aperture of the handle, 1812                     │
└─────────────────────────────────────────────────────────────────────┘
                                    ↓
┌─────────────────────────────────────────────────────────────────────┐
│ Sliding an engagement tip of an awl into the lumen of the housing through an │
│ opening in the handle, 1814                                         │
└─────────────────────────────────────────────────────────────────────┘
                                    ↓
┌─────────────────────────────────────────────────────────────────────┐
│ Inserting an awl screw through the handle into engagement with the awl, 1816 │
└─────────────────────────────────────────────────────────────────────┘
```

```
┌─────────────────────────────────────────────────────────────────────────┐
│ Actuating a release button disposed on an inner sleeve and partially disposed in │
│ an aperture in an outer sleeve of a housing, 1902                       │
└─────────────────────────────────────────────────────────────────────────┘
                                      │
                                      ▼
┌─────────────────────────────────────────────────────────────────────────┐
│ Sliding the inner sleeve distally out of a lumen of the housing through an │
│ opening in the outer sleeve, 1904                                       │
└─────────────────────────────────────────────────────────────────────────┘
                                      │
                                      ▼
┌─────────────────────────────────────────────────────────────────────────┐
│ Removing an awl screw from a handle of the housing, 1906                │
└─────────────────────────────────────────────────────────────────────────┘
                                      │
                                      ▼
┌─────────────────────────────────────────────────────────────────────────┐
│ Actuating a lock button partially disposed in the handle to disengage an awl │
│ slidably disposed therein, 1908                                         │
└─────────────────────────────────────────────────────────────────────────┘
                                      │
                                      ▼
┌─────────────────────────────────────────────────────────────────────────┐
│ Sliding an engagement tip of the awl proximally out of the lumen of the │
│ housing through an opening in the handle, 1910                          │
└─────────────────────────────────────────────────────────────────────────┘
                                      │
                                      ▼
┌─────────────────────────────────────────────────────────────────────────┐
│ Disengaging the knob from the handle and the outer sleeve, 1912         │
└─────────────────────────────────────────────────────────────────────────┘
```

```
┌─────────────────────────────────────────────────────────────────┐
│ Providing a spinal plate and an inserter configured to releasably engage the │
│ spinal plate, 2002                                              │
└─────────────────────────────────────────────────────────────────┘
                                   │
                                   ▼
┌─────────────────────────────────────────────────────────────────┐
│ Engaging the spinal plate with a distal tip of the inserter, 2004 │
└─────────────────────────────────────────────────────────────────┘
                                   │
                                   ▼
┌─────────────────────────────────────────────────────────────────┐
│ Using the inserter, positioning the spinal plate along a vertebra, 2006 │
└─────────────────────────────────────────────────────────────────┘
                                   │
                                   ▼
┌─────────────────────────────────────────────────────────────────┐
│ Using an awl of the inserter, forming a pilot hole in the vertebra, 2008 │
└─────────────────────────────────────────────────────────────────┘
                                   │
                                   ▼
┌─────────────────────────────────────────────────────────────────┐
│ Inserting a bone fastener through an aperture in the spinal plate and the pilot │
│ hole in the vertebra, thereby affixing the spinal plate to the vertebra, 2010 │
└─────────────────────────────────────────────────────────────────┘
```

FIG. 20

PLATE INSERTER INSTRUMENT

TECHNICAL FIELD

The subject matter described herein relates generally to insertion devices, systems, and methods for implantation and fixation of a spinal implant to a spine, and more particularly, to insertion devices, systems, and methods adapted for insertion of spinal plates.

BACKGROUND

The human spine is the axis of the skeleton, and includes cervical, thoracic and lumbar vertebrae. The bony vertebral bodies of the spine are separated by intervertebral discs, which act as joints but allow known degrees of flexion, extension, lateral bending, and axial rotation. The typical vertebra has a thick anterior bone mass called the vertebral body, with a neural (vertebral) arch that arises from the posterior surface of the vertebral body. The centers of adjacent vertebrae are supported by intervertebral discs. The intervertebral discs and/or vertebral bodies of the spine may be displaced or damaged due to trauma, disease, degenerative defects, or wear over an extended period of time. One result of this displacement or damage to a spinal disc or vertebral body may be chronic back pain. In many cases, to alleviate back pain from degenerated or herniated discs, the disc is removed along with all or part of at least one neighboring vertebra and is replaced by an implant that promotes fusion of the remaining bony anatomy.

The success or failure of spinal fusion may depend upon several factors. For instance, a spacer or implant or cage used to fill the space left by the removed disc and bony anatomy must be sufficiently strong to support the spine under a wide range of loading conditions. Additionally, the material used for the spacer should be biocompatible material and should have a configuration that promotes bony ingrowth. Further, the spacer should also be configured so that it is likely to remain in place once it has been positioned in the spine by the surgeon. The use of spinal plates may improve the rate of fusion and/or reduce the need for external bracing following a surgical procedure.

Spinal plates are typically implanted during surgery by affixing the plate to one or more selected vertebrae using bone fasteners. Insertion of spinal plates often includes using an inserter instrument to orient and insert the spinal plate into position for fixation to the spine. Affixing the spinal plate to the selected vertebra (e) may include preparing a portion of the spine to receive a fastener therein, such as using an awl to pierce the cortical bone and form a pilot hole for bone screw trajectory to fix the spinal plate to a vertebra. Drills or taps may also be used to improve case of placing fasteners. Bone fastener(s) may then be inserted through corresponding aperture(s) in the spinal plate and into the prepared bone.

It is desirable to provide improved instruments and methods for use during spinal plate insertion procedures, to reduce procedural time, e.g., time during which a patient is under anesthesia, and to provide the surgeon with good visualization of the surgical site and sensitive vascularization of the surrounding area.

SUMMARY

All aspects, examples and features mentioned below can be combined in any technically possible way.

An aspect of the disclosure provides an inserter for engaging and inserting a spinal plate, the inserter including: a housing extending along a longitudinal axis between a proximal end and a distal end of the inserter; an inner sleeve slidably disposed within the housing and configured to releasably engage the spinal plate at the distal end of the inserter; and an awl slidably disposed within the housing and configured to extend distally beyond the inner sleeve and to engage a cortical bone of a vertebra, thereby forming a pilot hole shaped and dimensioned to receive a bone fastener therein for affixing the spinal plate to the vertebra.

Another aspect of the disclosure provides a system including: a spinal plate having an aperture configured to receive a bone fastener; an inserter configured to releasably engage the spinal plate; and the bone fastener. The inserter includes: a housing extending along a longitudinal axis between a proximal end and a distal end of the inserter; an inner sleeve slidably disposed within the housing and having a distal tip configured to releasably engage the spinal plate; and an awl slidably disposed within the housing and configured to extend distally beyond the inner sleeve to engage a cortical bone of a vertebra, and to form a pilot hole in the vertebra that is shaped and dimensioned to receive the bone fastener therein. The bone fastener configured for insertion through the aperture and into the pilot hole to affix the spinal plate to the vertebra.

Another aspect of the disclosure provides a method for inserting a spinal plate, including: providing the spinal plate and an inserter configured to releasably engage the spinal plate, where the inserter includes a housing extending along a longitudinal axis between a proximal end and a distal end of the inserter, an inner sleeve slidably disposed within the housing, and an awl slidably disposed within the housing; engaging the spinal plate with a distal tip of the inner sleeve; using the inserter, positioning the spinal plate along a vertebra; using the awl, forming a pilot hole in the vertebra; and inserting a bone fastener through an aperture in the spinal plate and the pilot hole in the vertebra, thereby affixing the spinal plate to the vertebra.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings:

FIG. 18 illustrates a flow diagram of a method for assembling embodiments of the inserter according to the present disclosure.

FIG. 19 illustrates a flow diagram of a method for disassembling embodiments of the inserter according to the present disclosure.

FIG. 20 illustrates a flow diagram of a method of inserting a spinal implant using embodiments of the inserter according to the present disclosure.

Figure 1B:
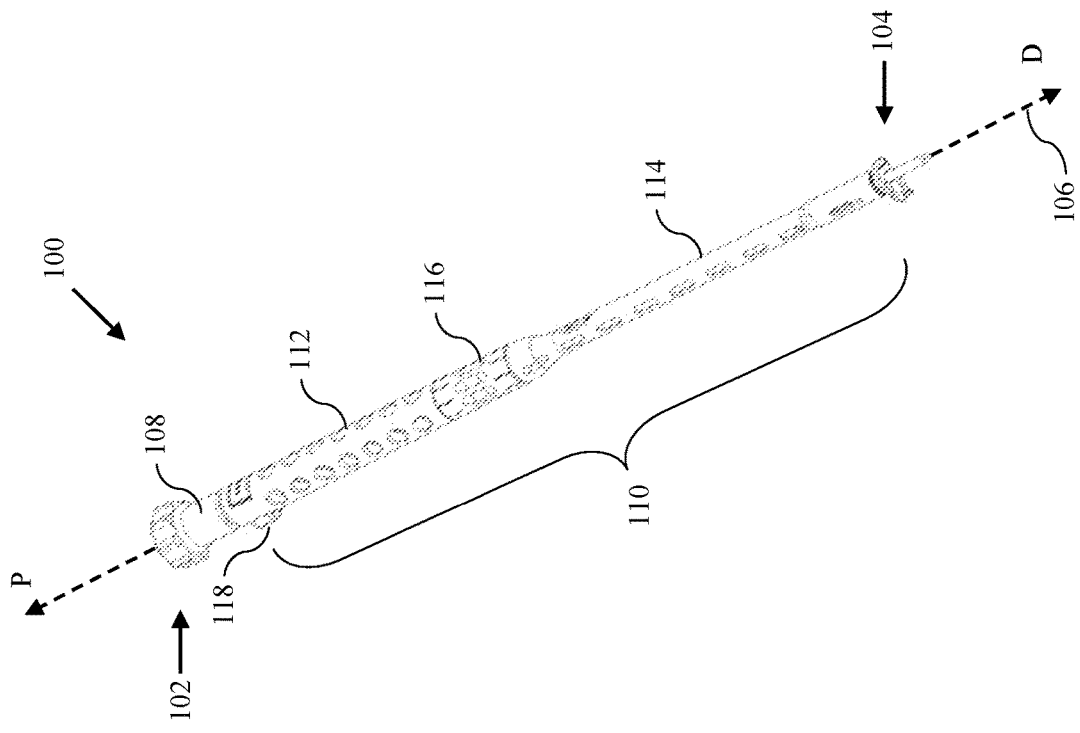
FIGS. 1A and 1B illustrate an assembled perspective view of one embodiment of an inserter instrument according to the present disclosure.

It is noted that the drawings of the subject matter are not necessarily to scale. The drawings are intended to depict only typical aspects of the subject matter, and therefore, should not be considered as limiting the scope of the disclosed subject matter. In the drawings, like numbering represents like elements between the drawings.

DETAILED DESCRIPTION

Aspects of the present disclosure provide inserter instruments for the insertion of spinal implants, such as spinal plates, and related methods for releasably engaging spinal implants using the inserter, in addition to systems including such inserters and corresponding implants.

Figure 1A:
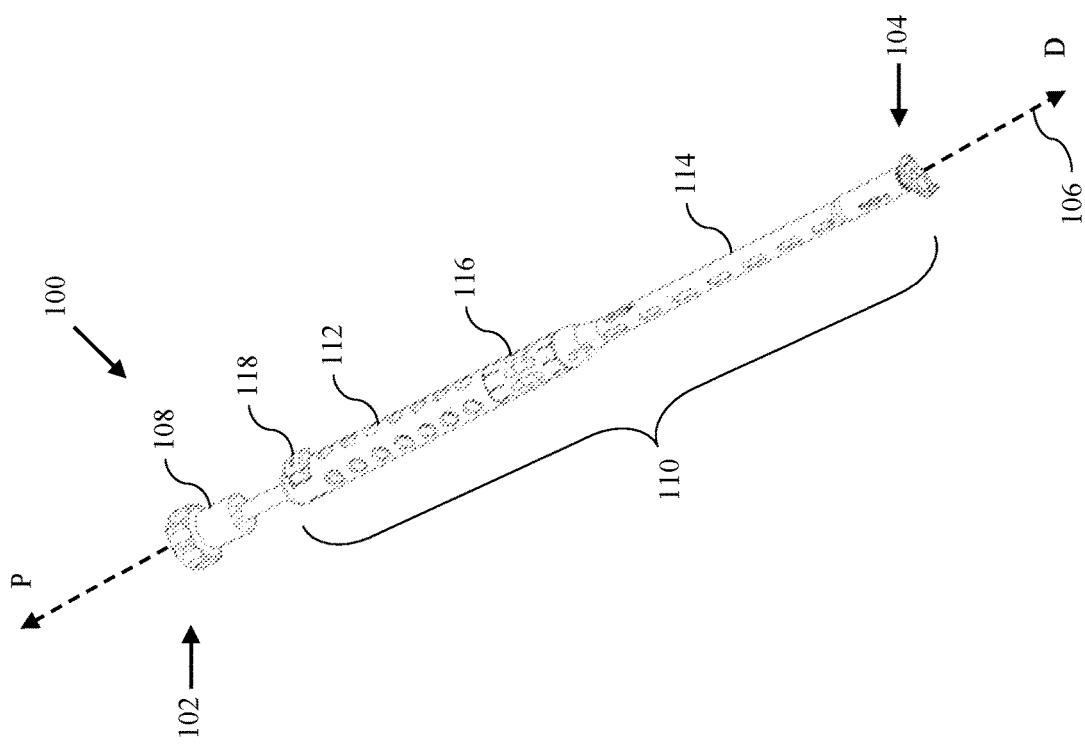

As used herein, the term "proximal" refers to the direction away from attachment of an element to the subject, shown in FIGS. 1A and 1B as direction P, while use of the term "distal" refers to the direction opposite the proximal direction and toward attachment of an element to the subject, shown in FIGS. 1A and 1B as direction D. As further used herein, the term "bone screw" is used interchangeably with, and is considered equivalent to and synonymous with the terms: bone fastener, fastener, fixation screw, spinal fixation screw, bone anchor, and pedicle screw.

Referring generally to FIGS. 1A, 1B, 2-6, 7A-7C, 8A-8C, 9A, 9B, 10, and 11, an embodiment of an inserter 100 is provided for use in inserting a spinal implant (e.g., a spinal plate) into a surgical site in a spine of a subject. As described herein, the inserter 100 may include a first portion, a second portion slidably disposed within the first portion, and a third portion slidably disposed within the first portion and/or second portion. The inserter 100 may be configured to actuate these portions to releasably engage the spinal implant and/or to prepare the surgical site for fixation of the spinal implant to the spine.

Figure 2:
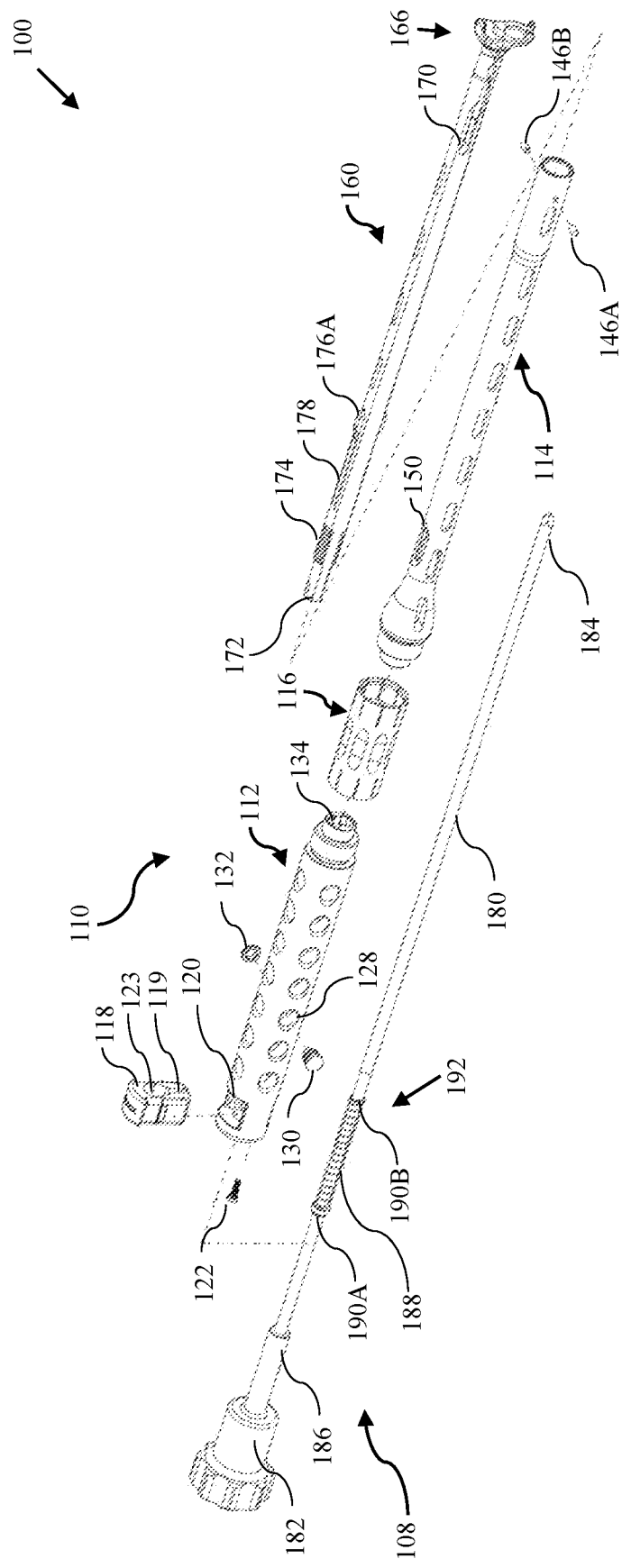
FIG. 2 illustrates an exploded perspective view of the inserter of FIG. 1.

FIGS. 1A-1B show an assembled perspective view of the inserter 100 in a retracted position (FIG. 1A) and an extended position (FIG. 1B), and FIG. 2 shows an exploded perspective view of the inserter 100. As shown, the inserter 100 extends between a proximal end 102 and a distal end 104 along a longitudinal axis 106. The first portion of the inserter 100 may be a housing 110 that includes a handle 112 at a first end, an outer sleeve 114 at a second end, and a knob 116 coupled between the handle 112 and the outer sleeve 114. The handle 112, outer sleeve 114, and knob 116 may be a single unitary structure or may include two or more portions that are coupled together to form the housing 110. Coupling the knob 116 with the handle 112 and the outer sleeve 114 may include any mechanical or chemical means of fixedly coupling these components such as, e.g., compression fit, snap fit, a fastener(s), adhesive, etc., thereby assembling the housing 110 of the inserter 100. The housing 110 may include a lumen extending continuously through each component of housing 110, such that a first bore formed in handle 112, a second bore formed in outer sleeve 114, and a third bore formed in knob 116 collectively form the lumen of the housing 110. The second portion of the inserter 100 may be an inner sleeve 160 (FIG. 2) configured to be slidably received within the lumen of the housing 110. The inner sleeve 160 may be shaped and dimensioned to slide through the second bore of the outer sleeve 114 via the distal end 104 of the inserter 100, matingly engage the first bore of the handle 112, and threadably engage the knob 116. The third portion of the inserter 100 may be an awl 108 configured to be slidably received within the lumen of the housing 110. The awl 108 may be shaped and dimensioned to slide through the first bore of the handle 112 via the proximal end 102 of the inserter 100, translate proximally and distally within the lumen relative to the housing 110, rotate within the lumen relative to the housing 110, and engage bone to form a pilot hole therein. The inserter 100 therefore may be used to releasably engage the spinal plate, position the spinal plate relative to one or more selected vertebrae, prepare the surgical site for fixation of the spinal plate to bone, and/or affix the spinal plate, as further described herein.

Figure 3:
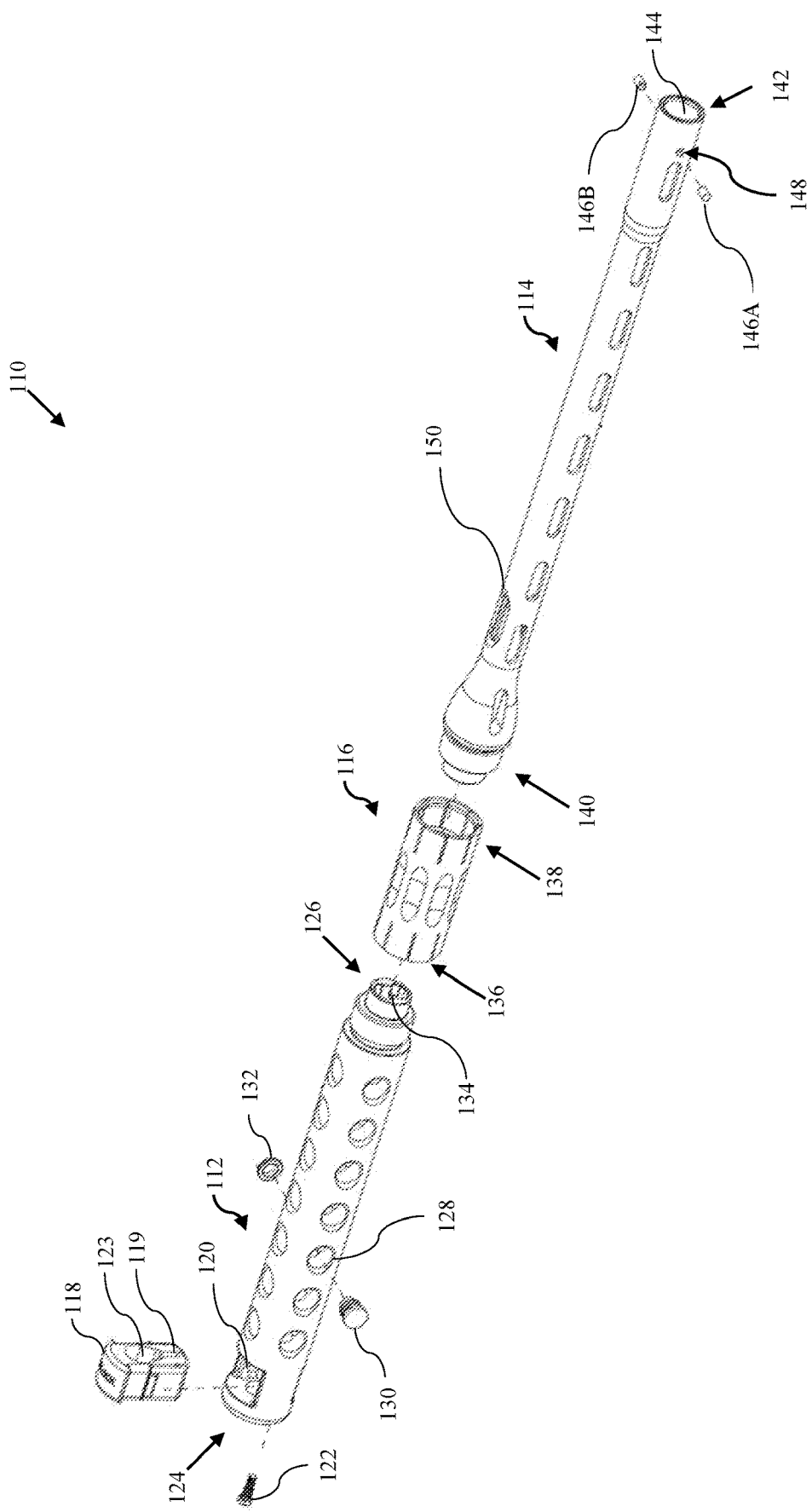
FIG. 3 illustrates an exploded perspective view of a housing of the inserter of FIG. 1.

FIG. 3 shows an exploded perspective view of the housing 110 of the inserter 100. As shown, the handle 112 of the housing 110 may be a substantially hollow, cylindrical, elongate body extending between a proximal end 124 and a distal end 126 thereof. The proximal end 124 may include an opening shaped and dimensioned to slidably receive the awl 108 therein. For example, an engagement tip 184 of the awl 108 (FIG. 2) may be inserted in a distal direction through an opening in the proximal end 124 of the handle 112 and through the lumen of the housing 110. The distal end 126 of the handle 112 may be shaped and dimensioned to engage the knob 116 and the inner sleeve 160. In particular, the distal end 126 of the handle 112 may be coupled to the knob 116, e.g., a proximal end 136 thereof, such that the handle 112 may be axially and rotationally fixed relative to the knob 116. The distal end 126 may include an aperture 134 shaped and dimensioned to engage a the inner sleeve 160, e.g., the proximal end 162 thereof. The knob 116 may provide a user with a readily accessible means of actuating the inner sleeve 160 to engage or disengage the spinal plate as described further herein.

As shown, the knob 116 of the housing 110 may be a substantially hollow, cylindrical, elongate body extending between a proximal end 136 and a distal end 138. The distal end 138 of the knob 116 may be shaped and dimensioned to engage the outer sleeve 114. In particular, the distal end 138 of the knob 116 may be coupled to a proximal end 140 of the outer sleeve 114, such that the outer sleeve 114 may be axially and rotationally fixed relative to the knob 116. As shown, the outer sleeve 114 of the housing 110 may be a substantially hollow, elongate body extending between the proximal end 140 and a distal end 142 thereof (FIG. 3). The distal end 142 of the outer sleeve 114 may include an opening 144 shaped and dimensioned to slidably receive the inner sleeve 160 therein, such that the inner sleeve 160 may slide, proximal end 162 first, and in a proximal direction through the outer sleeve 114 to engage the handle 112 and the knob 116. The knob 116 may include an internal thread (not shown) configured to threadably engage an external thread 174 disposed on the inner sleeve 160 (FIG. 2), such that the knob 116 rotatably engages the inner sleeve 160. As discussed herein, the knob 116 may be configured to rotate about the longitudinal axis 106, which in turn actuates the inner sleeve 160 to engage or disengage the spinal plate. In particular, rotating the knob 116 may cause the inner sleeve 160 to translate proximally or distally relative to the housing 110 due to the threaded relationship between the external threads 174 and the internal threads of the knob 116. For instance, rotating the knob 116 in a first direction (e.g., clockwise) may correspond to axial translation of the inner sleeve 160 in a proximal direction, which in turn causes a distal engagement portion 166 of the inner sleeve 160 (FIGS. 2, 4) to engage the spinal plate. Rotating the knob 116 in a second direction opposite the first (e.g., counterclockwise) may correspond to axial translation of the inner sleeve 160 in a distal direction, which in turn may cause the distal engagement portion 166 to disengage from, or release the spinal plate.

Figure 4:
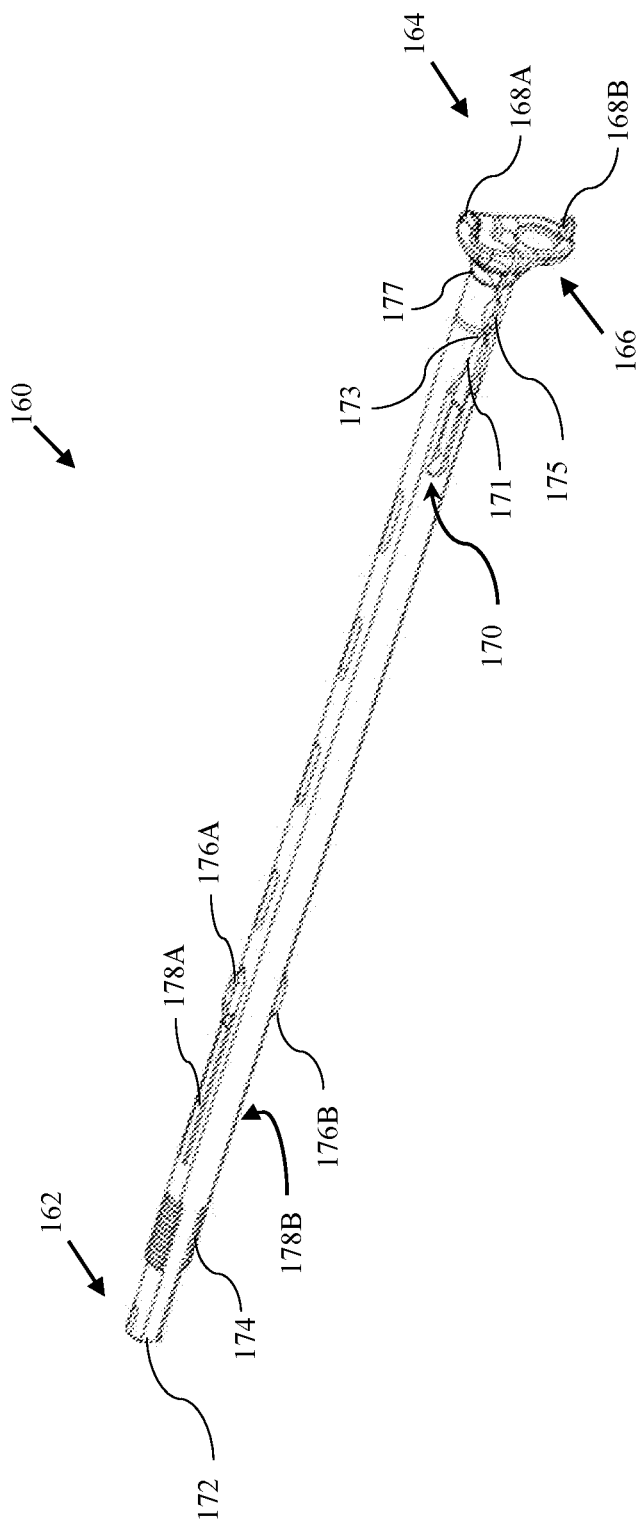
FIG. 4 illustrates a perspective view of an inner sleeve of the inserter of FIG. 1.

FIG. 4 shows a perspective view of the inner sleeve 160 of the inserter 100. As shown, the inner sleeve 160 may include a substantially hollow, elongate body extending between the proximal end 162 and a distal end 164 thereof (FIG. 4). As discussed herein, the proximal end 162 of the inner sleeve 160 may be configured to engage the distal end 126 of the handle 112. The distal end 126 of the handle 112 may include an aperture 134 (FIGS. 2, 3) shaped and dimensioned to receive the proximal end 162 of the inner sleeve 160 therein. In certain embodiments, the proximal end 162 of the inner sleeve 160 may include a keyed feature 172, and the aperture 134 may be correspondingly keyed to receive the keyed feature 172 therein, with a complementary fit. In some implementations, the keyed feature 172 and the aperture 134 may fit together in a male/female relationship. The keyed feature 172 may have a cross sectional shape of any non-circular geometry capable of transferring torque such as, e.g., rectangle, square, pentagon, hexagon, octagon, hexalobe, or star having any number of points, and be configured to couple the handle 112 and inner sleeve 160. In the example illustrated in FIGS. 2-4, the keyed feature 172 has an oblong cross sectional shape, and the aperture 134 includes an axially extending channel open to the distal end 126 of the handle 112.

The distal end 164 of the inner sleeve 160 may include a distal engagement portion 166 configured to releasably engage the spinal plate. The distal engagement portion 166 may include one or more engagement arms 168A, 168B configured to releasably engage the spinal plate (FIG. 4). For instance, the distal engagement portion 166 may include a first engagement arm 168A and a second engagement arm 168B (together, pair of engagement arms 168A, 168B) which are configured to releasably engage one or more features of the implant such as, e.g., a pair of complementary bores disposed in a spinal plate. The pair of engagement arms 168A, 168B may be movable between an open position, in which the engagement arms 168A, 168B may receive or release the spinal plate, and a closed position, in which the engagement arms 168A, 168B are closed around and engage the implant, e.g., the spinal plate.

The inner sleeve 160 may include a slot 170 laterally disposed between the first engagement arm 168A and the second engagement arm 168B. The slot 170 may be shaped and dimensioned to receive one or more release pins 146A, 146B therein (FIGS. 2-4). For example, the slot 170 may be shaped and dimensioned to engage a release pin such as, e.g., a first release pin 146A. In certain embodiments, the slot 170 may be shaped and dimensioned to additionally engage a second release pin 146B, such that the slot 170 engages a pair of release pins 146A, 146B. The release pin(s) 146A, 146B may be configured to engage the pair of engagement arms 168A, 168B in response to distal translation of the inner sleeve 160 relative to the housing 110. The relationship between the engagement arms 168A, 168B and the release pin(s) 146A, 146B in turn causes the engagement arms 168A, 168B to physically separate to transition into the open position.

As shown in FIGS. 2-3, the release pin(s) 146A, 146B may be at least partially disposed within the outer sleeve 114, and may be circumferentially spaced from one another by, e.g., about 180 degrees around the circumference of the outer sleeve 114. The outer sleeve 114 may include an aperture 148 disposed therein, which radially extends through the outer sleeve 114 at an angle substantially perpendicular to the longitudinal axis 106. The aperture 148 may be shaped and dimensioned to receive the first release pin 146A through a first opening. In some embodiments, a second aperture may be located on an opposite side of the outer sleeve 114, adapted to receive the second release pin 146B in similar fashion. In some embodiments, the aperture 148 may extend across a diameter of the outer sleeve 114, and the second release pin 146B may be received through the opposite end of the aperture 148 from the first release pin 146A. When the inserter 100 is assembled for use, the release pin(s) 146A, 146B extend through the aperture 148 in the outer sleeve 114 and through the slot 170 into the lumen of the housing 110. The first and second release pins 146A, 146B may each be shorter than a radius of the outer sleeve 114, such that when fully inserted, each release pin 146A, 146B extends toward but does not reach the longitudinal axis 106 of the device. As a result, a space remains between the radially inward ends of the first release pin 146A and the second release pin 146B, such that when the inserter 100 is assembled for use, the awl 108 may distally slide between or otherwise extend distally beyond the release pin(s) 146A, 146B into the extended position (FIG. 1B).

In the closed position, distal translation of the inner sleeve 160 relative to the housing 110 may drive the slot 170 into contact with the release pin(s) 146A, 146B, which in turn physically separate the first engagement arm 168A and the second engagement arm 168B to a pre-determined distance (i.e., transition to the open position). The pre-determined distance therefore may be based at least in part on the shape and dimensions of the release pin(s) 146A, 146B, and of the slot 170. The release pin(s) 146A, 146B may be driven between a proximal end and a distal end of the slot 170, which may correspond to a varying separation distance between the pair of engagement arms 168A, 168B along a length of the slot 170. As the inner sleeve 160 translates distally, the release pin(s) 146A, 146B correspondingly translate distally within the slot 170, causing the pair of engagement arms 168A, 168B to physically separate as the release pin(s) 146A, 146B contact a narrower portion of the slot 170. The dimensions of the release pin(s) 146A, 146B and the slot 170 may be selected and/or modified to accommodate the shape and dimensions of the spinal plate intended for insertion with the inserter 100, and the corresponding desired positions of the engagement arms 168A, 168 in the open and closed positions.

Figure 7A:
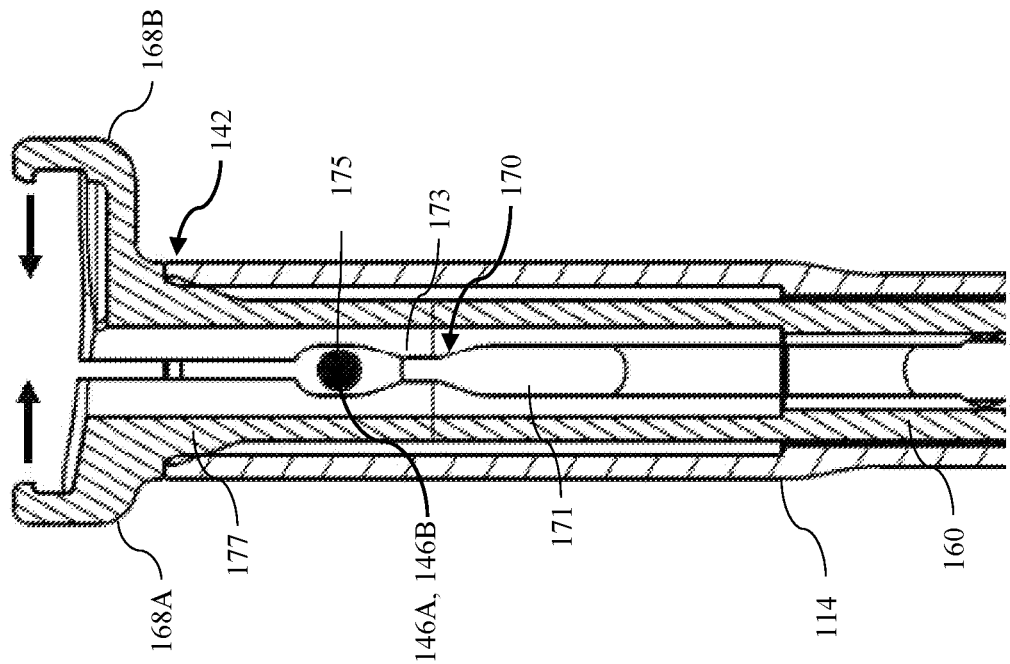
FIGS. 7A-7C illustrate cross-sectional views of a distal end of the inserter of FIG. 1.
Figure 7B:
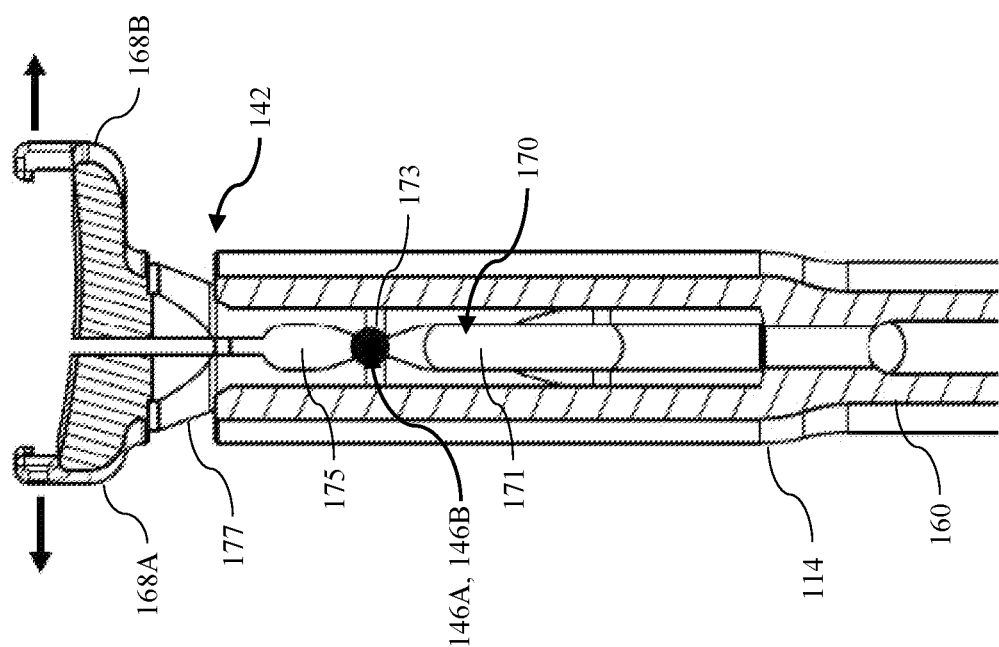
Figure 7C:
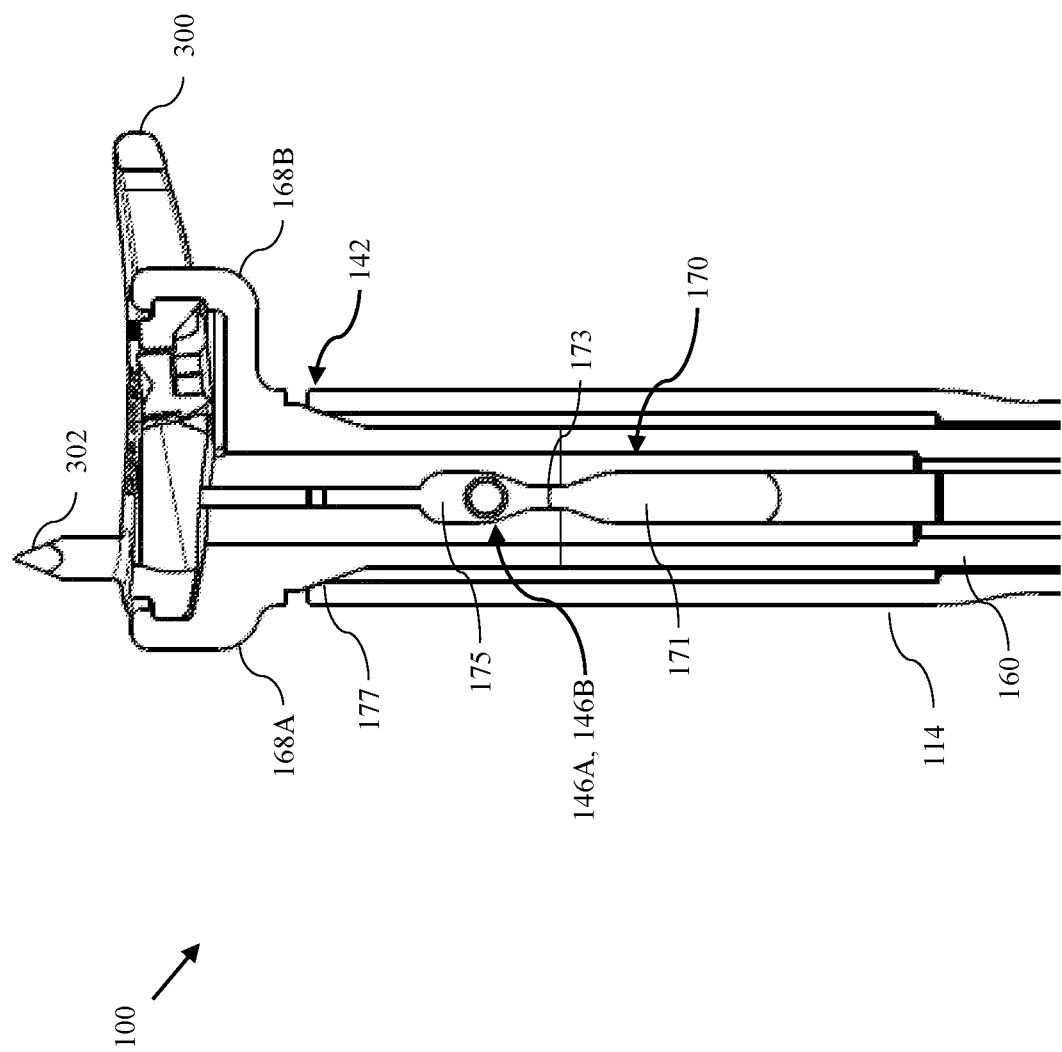

As shown in FIGS. 7A-7C, the inner sleeve 160 may include a tapered portion 177 disposed proximally relative to the pair of engagement arms 168A, 168B. The tapered portion 177 may correspond to a portion of the inner sleeve 160 having a varying diameter along a length thereof. For example, the tapered portion 177 may have a first, smaller diameter at a proximal end of the tapered portion 177, transitioning to a second, larger diameter at a distal end 164 of the tapered portion 177 adjacent the engagement arms 168A, 168B.

FIGS. 7A and 7B show a cross-sectional view of the inserter 100 as the pair of engagement arms 168A, 168B transition into the open position (FIG. 7A) and the closed position (FIG. 7B), respectively. As shown in FIG. 7A, as the engagement arms 168A, 168B transition into the open position, the release pin(s) 146A, 146B translate distally along slot 170. The slot 170 may have a cross-sectional width that varies along a length thereof. For example, in certain embodiments, the slot 170 may have a first width 171 at a proximal end thereof, transitioning to a narrower portion having a second width 173 part way along the length thereof, and finally transitioning to a third width 175 at a position distal of the narrower portion. The first and third widths 171, 175 may be the same or may be different from one another, but are in any case both wider than the second width 173. The cross-sectional width of the slot 170 therefore may gradually decrease (e.g., from the first width 171 to the second width 173) and gradually increase (e.g., from the second width 173 to the third width 175) such that the slot 170 provides one or more ramped surfaces which enable the release pin(s) 146A, 146B to translate along the length of the slot 170. As the release pin(s) 146A, 146B translate distally from the first width 171 portion of slot 170 to the narrower second width 173 portion of slot 170, this engagement causes separation between the first engagement arm 168A and the second engagement arm 168B to the pre-determined distance. As the inner sleeve 160 continues to translate distally into the open position along the second ramp from the second width 173 portion to the third width 175 portion, the release pin(s) 146A, 146B transition to the third width 175 portion of the slot 170. FIG. 7C shows a cross-sectional view of the inserter 100 with the pair of engagement arms 168A, 168B in the closed position and engaged with a spinal implant 300 having a bone fastener 302 disposed therein.

FIG. 7B illustrates the transition of the inner sleeve 160 and engagement arms 168A, 168B from the open position to the closed position. To close the engagement arms 168A, 168B, the inner sleeve 160 is translated proximally, causing the inner sleeve 160 to retract into the housing 110, and the tapered portion 177 of the inner sleeve 160 to contact the distal end 142 of the outer sleeve 114. This may be actuated by, e.g., rotating the knob 116, and in turn causes the engagement arms 168A, 168B to collapse the pre-determined distance into the closed position. As the inner sleeve 160 proximally translates into the closed position, the release pin(s) 146A, 146B transition from the distal-most (e.g., third width 175) portion of the slot 170 to the narrower (e.g., second width 173) portion, and finally to the wider (e.g., first width 171) portion at the proximal end of the slot 170. Rotating the knob 116 in the first direction and second direction, thereby initiating proximal and distal translation, respectively, therefore causes the distal engagement portion 166 of the inner sleeve 160 to transition between the closed position (FIG. 7B) and open position (FIG. 7A) for releasably engaging the spinal plate.

Figure 11:
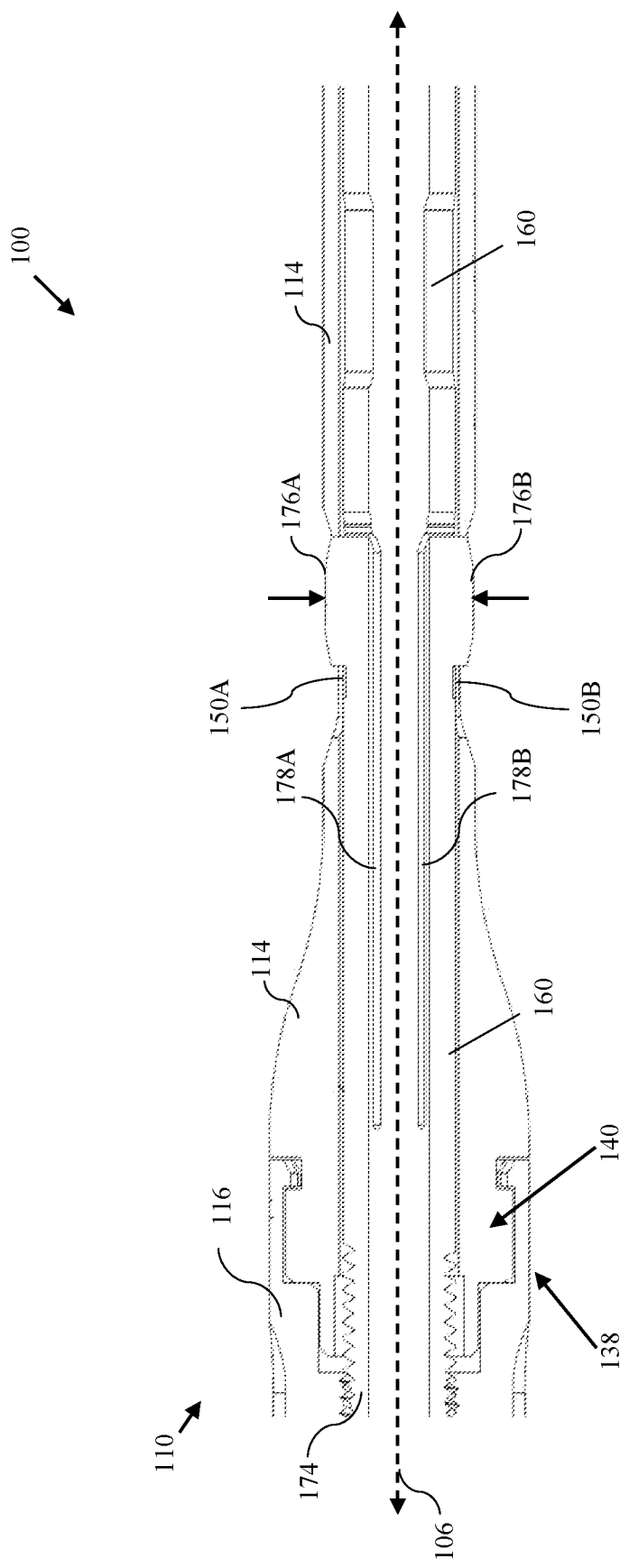
FIG. 11 illustrates a cross-sectional side view of the inserter of FIG. 1.

With reference to FIGS. 2, 4, 6, and 10-11, the inserter 100 may further include a first release button 176A and a second release button 176B (together, release buttons 176A, 176B) disposed on the inner sleeve 160 and at least partially within the housing 110. The release buttons 176A, 176B may be configured to release the inner sleeve 160 from the housing 110 for disassembly of the inserter 100. As shown in FIGS. 4 and 11, the inner sleeve 160 may include flexible portions 178A, 178B. Each flexible portion 178A, 178B includes an axially extending flexible member affixed to a portion of the inner sleeve 160, and an associated release button 176A, 176B. The inner sleeve 160 may be shaped and dimensioned to allow passage of the same through the outer sleeve 114 such that, when assembled, the release buttons 176A, 176B are received in respective apertures 150A, 150B (FIG. 3) on opposite sides of the outer sleeve 114. When assembled, distal or proximal translation of the inner sleeve 160 causes distal or proximal translation, respectively, of the release buttons 176A, 176B within respective apertures 150A, 150B of the outer sleeve 114. For example, in the closed position, distal translation of the inner sleeve 160 relative to the housing 110 may cause distal translation of the release buttons 176A, 176B from a proximal end to a distal end of the apertures 150A, 150B. The release buttons 176A, 176B may engage the distal end of the apertures 150A, 150B in the open position such that the inner sleeve 160 cannot distally translate further and is therefore retained within the outer sleeve 114. In the open position, proximal translation of the inner sleeve 160 relative to the housing 110 may cause proximal translation of the release buttons 176A, 176B from the distal end to the proximal end of the apertures 150A, 150B. In this manner, the apertures 150A, 150B may act is a limiter for proximal and distal translation of the inner sleeve 160. When assembled, a user may press the release buttons 176A, 176B to displace the flexible portions 178A, 178B in a radially inward direction relative to the housing 110 and apertures 150A, 150B to disengage the inner sleeve 160 and outer sleeve 114. When disengaged from the outer sleeve 114, the inner sleeve 160 may rotate relative to the knob 116, such that a user may rotate the inner sleeve 160 to disengage the knob 116, and thereby allow the inner sleeve 160 to be slidably removed from the outer sleeve 114. Moreover, when disengaged from the outer sleeve 114, the keyed portion 172 may disengage the aperture 134 in the handle 112. This disengagement then allows the inner sleeve 160 to slide in a distal direction through the housing 110, thereby disassembling the inserter 100.

Figure 5:
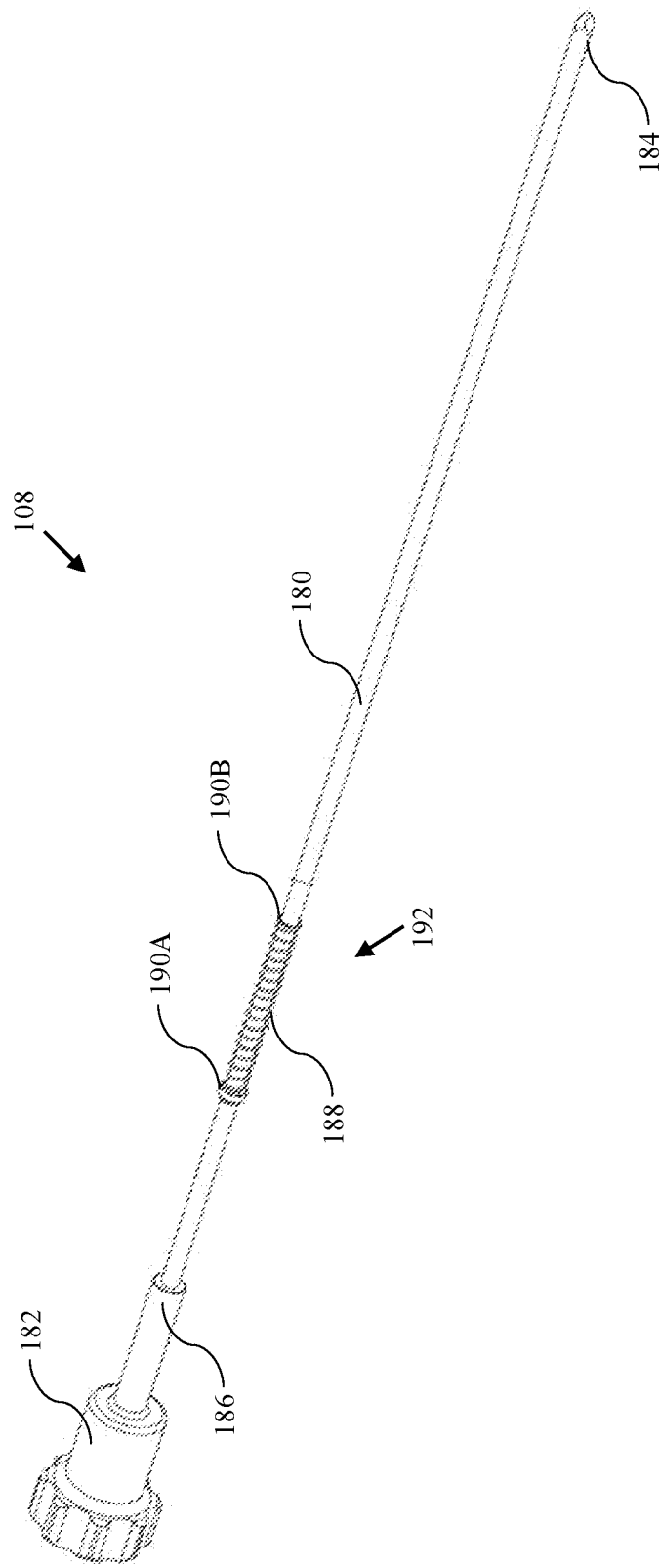
FIG. 5 illustrates a perspective view of an awl of the inserter of FIG. 1.
Figure 14B:
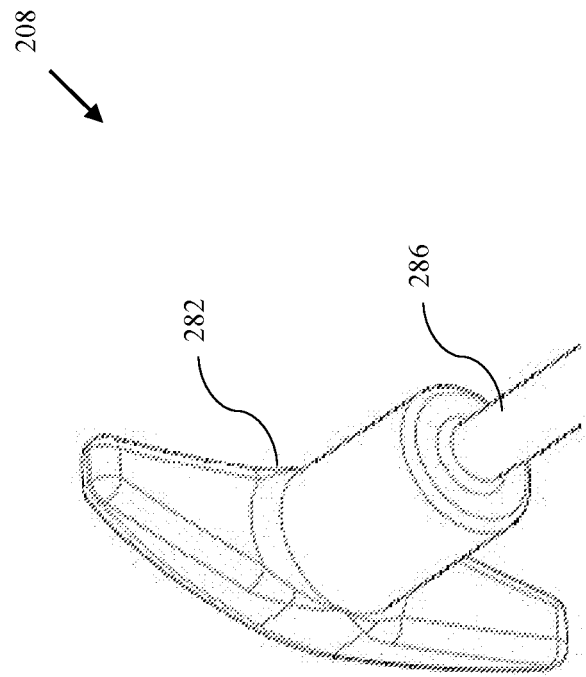
FIGS. 14A and 14B illustrate a perspective view of the awl handle of the inserters of FIGS. 1 and 12, respectively.
Figure 14A:
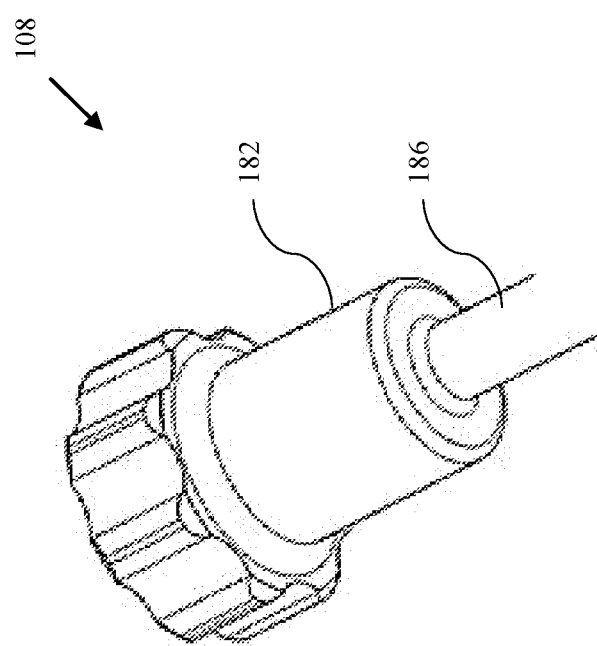

Referring back to FIGS. 2 and 3, as previously described, the awl 108 may be slidably received within the housing 110, including the handle 112, outer sleeve 114, and knob 116. FIG. 5 shows a perspective view of the awl 108 of the inserter 100. As shown, the awl 108 may include the awl handle 182, a shaft 180 extending distally from the awl handle 182, and an engagement tip 184 at the opposite end of the shaft 180 from the awl handle 182. In various embodiments, the awl handle 182 may have a rounded shape with grooves disposed thereon, such as shown in FIG. 14A, or may be T-shaped, such as awl handle 282, shown in FIG. 14B. Other awl handle embodiments are also possible and are contemplated as part of the disclosure. When the inserter 100 is assembled, the awl 108 may be slidably disposed within the housing 110 and configured to be selectively extended distally beyond the inner sleeve 160. The engagement tip 184 may be shaped and dimensioned to pierce bone (e.g., cortical bone), such that in the extended position, the awl 108 is configured to engage bone via the engagement tip 184 to form one or more pilot holes therein.

The handle 112 may further include an aperture 120 shaped and dimensioned to receive a lock button 118 therein. The lock button may be adapted to move between a locked position and an unlocked position. In the locked position, the lock button 118 may limit (e.g., lock) axial translation of the awl 108 in the distal direction, while allowing free rotation thereof. In the unlocked position, the lock button 118 may permit distal translation of the awl 108 relative to the housing 110, as well as free rotation about the shaft 180 of the awl 108.

The lock button 118 may be partially disposed within the aperture 120, which extends through the handle 112, such that the lock button 118 is movable within the aperture 120 in a radially inward and outward direction relative to the housing 110 and the longitudinal axis 106. For instance, the lock button 118 may be movable along an axis 121 (FIG. 6) extending through the aperture 120 and intersecting with the longitudinal axis 106 at a substantially perpendicular angle. Actuating the lock button 118 in a radially inward direction relative to the handle 112 may cause the lock button 118 to translate radially across the longitudinal axis 106 and transition between a locked position and an unlocked position. The lock button 118 includes an axially extending opening 123 therethrough, which, through its irregular cross sectional shape, is adapted to accommodate the shaft 180 of the awl 108 therethrough in both of the unlocked and locked positions (FIGS. 9A and 9B, respectively), and to selectively accommodate the shoulder 186 of the awl 108 therein in the unlocked position (FIG. 9A) only.

Figure 9A:
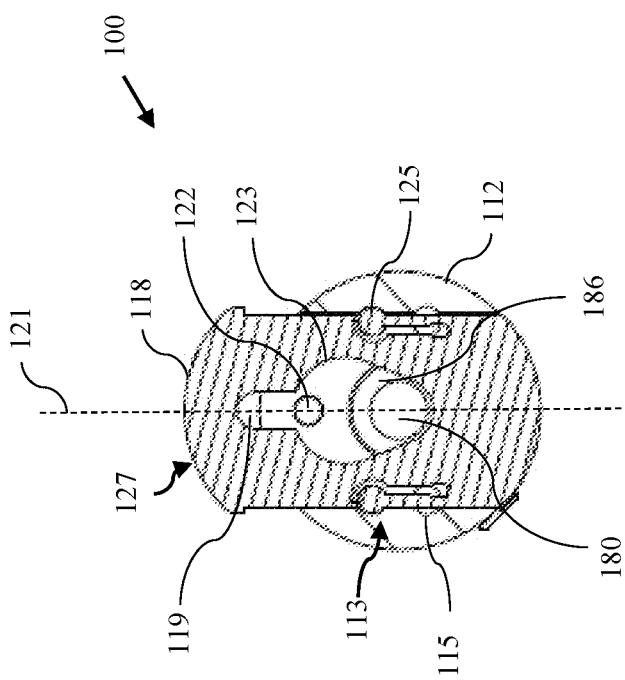
FIGS. 9A and 9B illustrate cross-sectional views of the inserter of FIG. 1.
Figure 9B:
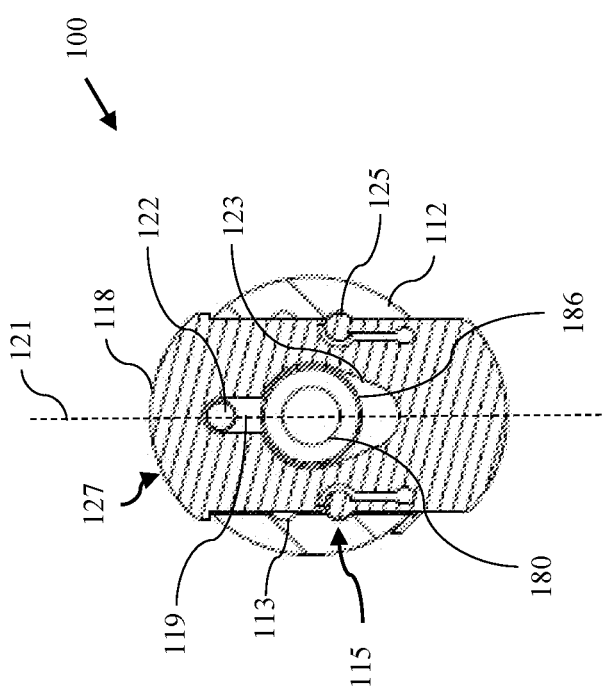
Figure 10:
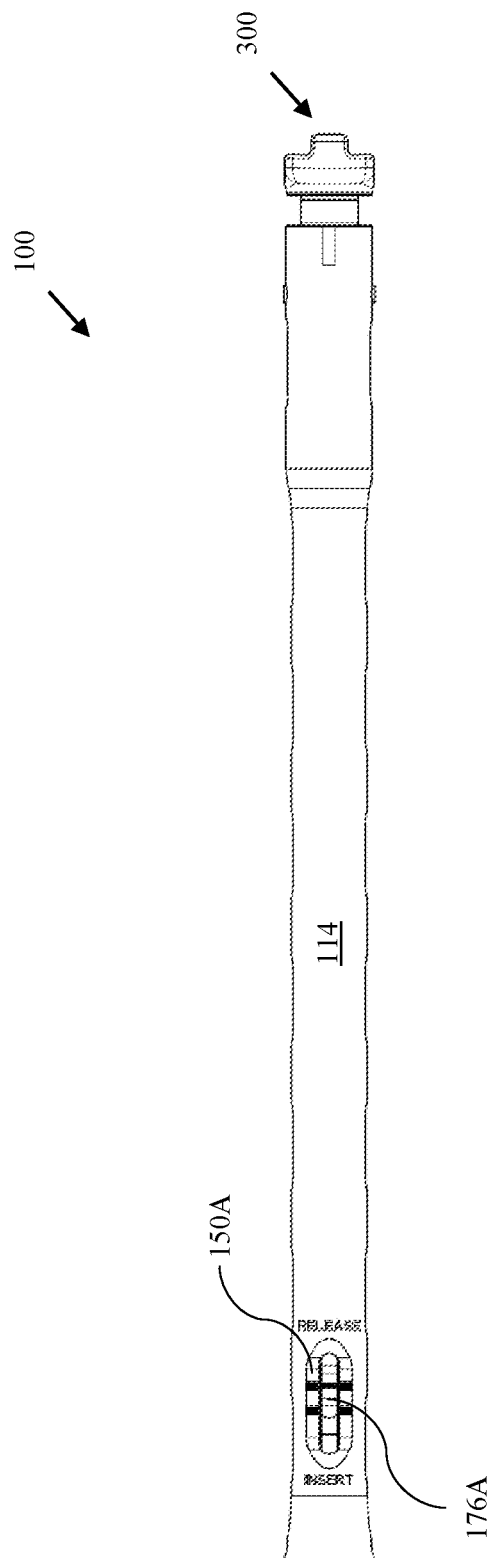
FIG. 10 illustrates a side view of the inserter of FIG. 1.

FIGS. 9A and 9B show cross-sectional views of the inserter 100 with the lock button 118 in the unlocked position (FIG. 9A) and the locked position (FIG. 9B). In the unlocked position of FIG. 9A, the lock button 118 provides internal clearance through opening 123 to allow the awl 108 to translate distally for deployment, e.g., to form a pilot hole for a bone fastener. In particular, the lock button 118 accommodates the shoulder 186 of the awl 108 within the axially extending opening 123. Upon actuating the lock button 118 and transitioning to the locked position, shown in FIG. 9B, the shape and position of the axially extending opening 123 in the lock button 118 interferes with the shoulder 186 of the awl 108. Because the shoulder 186 cannot be accommodated within the axially extending opening 123 in this position, distal translation of the awl 108 is limited, and further deployment of the awl 108 is prevented. Despite the limitation on distal translation in the locked position, the awl 108 maintains freedom to translate in the proximal direction throughout both positions and transitions therebetween, thereby providing a cushion when removing the awl 108 from hard bone.

Figure 6:
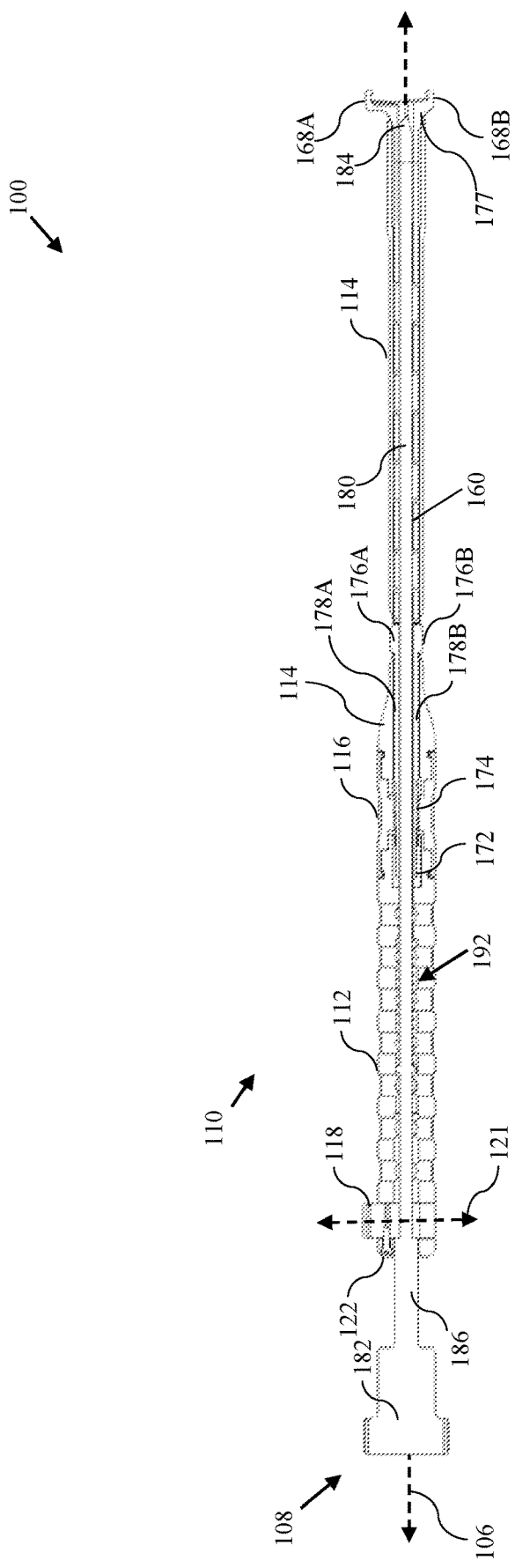
FIG. 6 illustrates a cross-sectional view of the inserter of FIG. 1.

A lock screw 122 may be partially disposed within the handle 112 and configured to movably retain the lock button 118 within the aperture 120 (FIGS. 2, 3, 6). In some implementations, the lock screw 122 may extend through an aperture (not shown) disposed in the proximal end 124 of the handle 112 and into engagement with a portion of the axially extending opening 123 in the lock button 118. In certain embodiments, the aperture may extend in a distal direction from the proximal end 124 face of the handle 112, substantially parallel to the longitudinal axis 106. For example, the lock screw 122 may extend along an axis substantially parallel to the longitudinal axis 106 which intersects the aperture 120 such that, when assembled, the lock screw 122 extends in the distal direction to engage and retain the lock button 118 within the aperture 120 of the handle 112.

As shown, the axially extending opening 123 may include a recess 119 disposed therein, which may be shaped and dimensioned to engage the lock screw 122. In the locked position (FIG. 9B), the recess 119 in the lock button 118 is disengaged from the lock screw 122. Actuating the lock button 118 into the unlocked position (FIG. 9A) drives the recess 119 in the lock button 118 into engagement with the lock screw 122. The aperture 120 may extend radially through an entire cross-section of the handle 112, and engagement with the lock screw 122 may prevent the lock button 118 from translating entirely through a length of the aperture 120, thereby retaining the lock button 118 within the handle 112. Moreover, the lock screw 122 may guide the lock button 118 into the unlocked position such that, e.g., the lock button 118 is aligned with the awl 108 to accommodate distal translation of the shoulder 186 through the axially extending opening 123.

As further shown in FIGS. 9A and 9B, the lock button 118 may include one or more lock tabs 125 disposed thereon. Each lock tab 125 may be configured to engage one or more corresponding complementary grooves disposed on an inner surface of the handle 112. The grooves may include, e.g., a first groove position 113 and a second groove position 115 (collectively, groove positions 113, 115) disposed on an inner surface of the handle 112. The first and second groove positions 113, 115 may be axially spaced from one another relative to the axis 121. In some embodiments, grooves at positions 113 and 115 may be independent grooves, while in other embodiments, the grooves at positions 113 and 115 may be in communication with one another via, e.g., a channel, which may have a depth that is, e.g., shallower than that of the grooves. In the latter embodiment, the positions 113 and 115 are different positions within a single groove, rather than independent grooves. In either case, as shown in FIG. 9B, groove position 113 may be configured to accommodate and engage a lock tab 125 at a first location in the handle 112. Engagement of lock tab 125 with groove position 113 may correspond to a position of the lock button 118 in which the awl 108 is unlocked and free to translate distally. As shown in FIG. 9A, groove position 115 may be configured to similarly accommodate and engage a lock tab 125 at a second location in the handle 112. Engagement of the lock tab 125 with the groove position 115 may correspond to a position of the lock button 118 in which the awl 108 is locked, and translation thereof in a distal direction is limited. The lock tabs 125 may engage one or the other of the groove positions 113, 115 to retain the lock button 118 in a respective one of the locked or unlocked positions, e.g., until subsequent actuation of the lock button 118. Actuating the lock button 118 along the axis 121, e.g. by pressing on surface 127, may cause the lock tabs 125 to bend, displace or otherwise disengage from the grooves 113, 115. While disengaged from the grooves 113, 115, the lock button 118 may translate along axis 121 relative to the handle 112 and transition between the locked and unlocked positions.

In some implementations, the lock button 118 may further include a biasing element disposed therein, such as a lock spring (not shown), which may be configured to bias the lock button 118 against force applied by pressing on surface 127. In the unlocked position, depressing the lock button 118 relative to the handle 112 may compress the biasing element in a radially inward direction, and in turn load the biasing element such that the biasing element biases the lock button 118 in a radially outward direction relative to the handle 112. In the locked position, radially depressing the lock button 118 relative to the handle 112 may cause the lock tabs 125 to disengage from the first groove position 113, which in turn causes the biasing element to release in the radially outward direction, and which in turn causes the lock button 118 to translate along axis 121 and into engagement between the lock tab(s) 125 and the second groove 115 in the unlocked position.

Figure 8A:
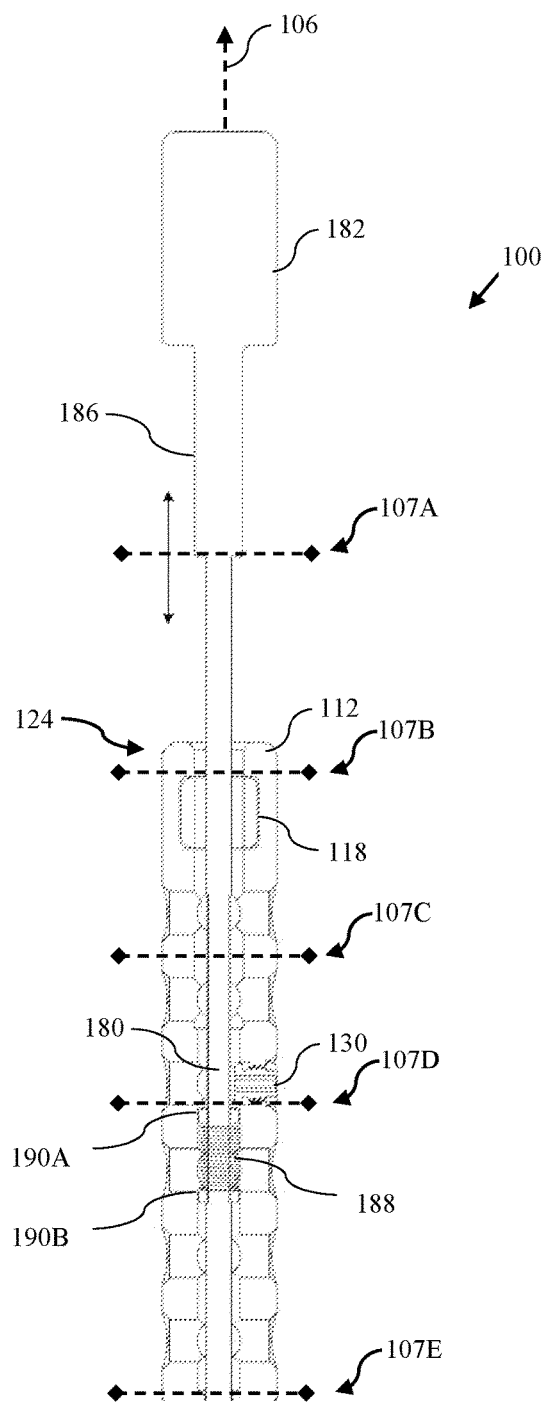
FIGS. 8A-8C illustrate cross-sectional views of the proximal end of the inserter of FIG. 1.

In the locked position (FIGS. 8A and 8B), the lock button 118 may engage a distal end of the shoulder 186 of the awl 108, and thereby prevent distal translation of the shoulder 186 beyond the lock button 118 within the bore of the handle 112. In the locked position, the shoulder 186 of the awl 108 may axially translate between a first position 107A and a second position 107B. As shown in FIG. 8A, which depicts the retracted position of the inserter 100, the shoulder 186 of the awl 108 extends proximally to the first position 107A. Distal translation of the awl 108 drives the shoulder 186 into engagement with the lock button 118 at the second position 107B (FIG. 8B), thereby preventing further distal translation of the awl 108. In the locked position, the awl 108 may freely rotate (e.g., in a clockwise or counter-clockwise direction).

In the unlocked position (FIG. 8C), the change in position of the lock button 118 accommodates the shoulder 186 of the awl 108 therethrough, and thereby permits distal translation of the awl 108 relative to the housing 110. In the unlocked position, the shoulder 186 of the awl 108 may distally translate to a third position 107C, and the awl handle 182 may engage the proximal end 124 of the handle 112, thereby preventing further distal translation of the awl 108 relative to the housing 110. The awl 108 may freely rotate throughout, e.g., by rotating the awl handle 182 clockwise or counter-clockwise. Rotating the awl handle 182 may cause the engagement tip 184 and the shaft 180 to rotate about the longitudinal axis 106, and enable a user to gently free the engagement tip 184 from the pilot hole in the bone.

Figure 8B:
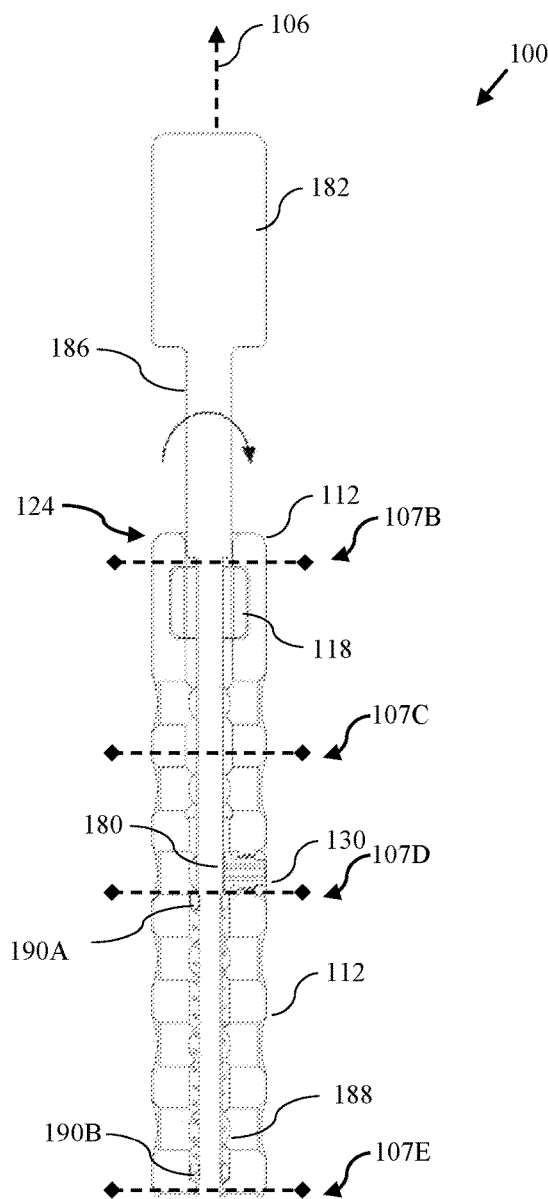
Figure 8C:
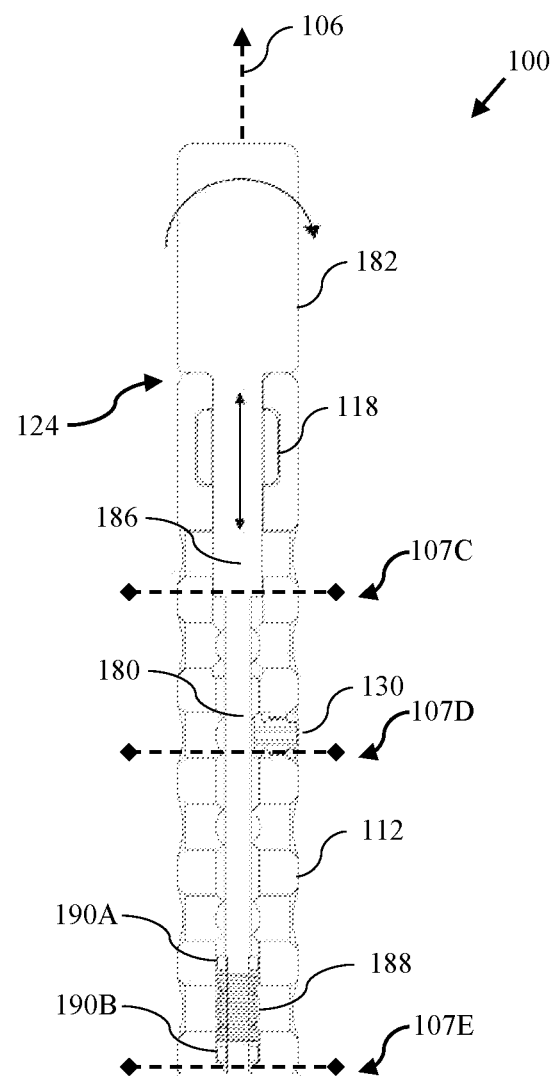

The handle 112 (FIG. 3) may include an aperture 128 configured to receive an awl screw 130 therein, which may be shaped and dimensioned to extend through the aperture 128 to engage the awl 108 within the bore of the handle 112. The awl screw 130 may extend radially through a cross-section of the handle 112 and engage a screw cap 132 to fixedly couple the awl screw 130 within the handle 112. As shown in FIGS. 8A-8C, the awl screw 130 may define a fourth position 107D along the longitudinal axis 106, such that when the inserter 100 is assembled, the awl screw 130 may engage a portion of the awl 108 within the lumen of the housing 110 at the fourth position 107D. The awl screw 130 may be configured to engage the shaft 180 at the fourth position 107D to prevent disassembly of the inserter 100 such that, e.g., the awl screw 130 prevents the awl 108 from sliding proximally through the opening in the proximal end 124 of the handle 112.

In some implementations, the awl screw 130 is configured to engage a spring assembly 192 of the awl 108 (FIGS. 5-6) at the fourth position 107D. The spring assembly 192 may be configured to bias the awl 108 in a distal or proximal direction relative to the housing 110. The spring assembly 192 may include an awl spring 188 disposed around the shaft 180, which may compress in the distal or proximal direction in response to pushing or pulling, respectively, on the awl handle 182 relative to the housing 110. The spring assembly 192 may include a fastener configured to affix the awl spring 188 to the shaft 180, such as a first snap ring 190A and a second snap ring 190B (collectively, snap rings 190A, 190B) configured to couple opposite ends of the awl spring 188 to the shaft 180 at respective positions between the awl handle 182 and engagement tip 184. The spring assembly 192 may be disposed around a recessed portion of the shaft 180. The recessed portion may have a relatively smaller diameter compared to that of a non-recessed portion of the shaft 180. The snap rings 190A, 190B may be shaped and dimensioned to couple the awl spring 188 at opposite ends of the recessed portion. The snap rings 190A, 190B may be configured to slide along the recessed portion of the shaft 180 between first and second ends thereof. The handle 112 and/or awl screw 130 may be configured to engage one of the snap rings 190A, 190B at a fixed location within the lumen of the housing 110, such that the other one of the snap rings 190A, 190B can translate toward the fixed location and thereby compress the awl spring 188. For example, in the retracted position of the inserter 100 (FIG. 8A), the first snap ring 190A may engage the awl screw at the fourth position 107D. As the shaft 180 slides proximally through the housing 110, the second snap ring 190B may compress the awl spring 188 in a proximal direction toward the fourth position 107D. In the extended position of the inserter 100 (FIG. 8C), the second snap ring 190B may engage a portion of the handle 112 at a fifth position 107E. As the shaft 180 slides distally through the housing 110, the first snap ring 190A may compress the awl spring 188 in a distal direction toward the fifth position 107E. Compressing the awl spring 188 in the distal or proximal directions (e.g., due to pushing or pulling the awl handle 182) may decrease a velocity at which the awl 108 translates distally or proximally along the longitudinal axis 106. For example, pushing the awl handle 182 distally may cause the awl spring 188 to compress in the distal direction, which in turn decreases distal translation speed of engagement tip 184 through the lumen of housing 110 and into bone engagement. Similarly, pulling awl handle 182 proximally may cause awl spring 188 to compress in the proximal direction, which in turn decreases proximal translation speed of engagement tip 184 through the lumen of housing 110 (e.g., to gently remove engagement tip 184 from a pilot hole for retraction into outer sleeve 114).

Figure 12B:
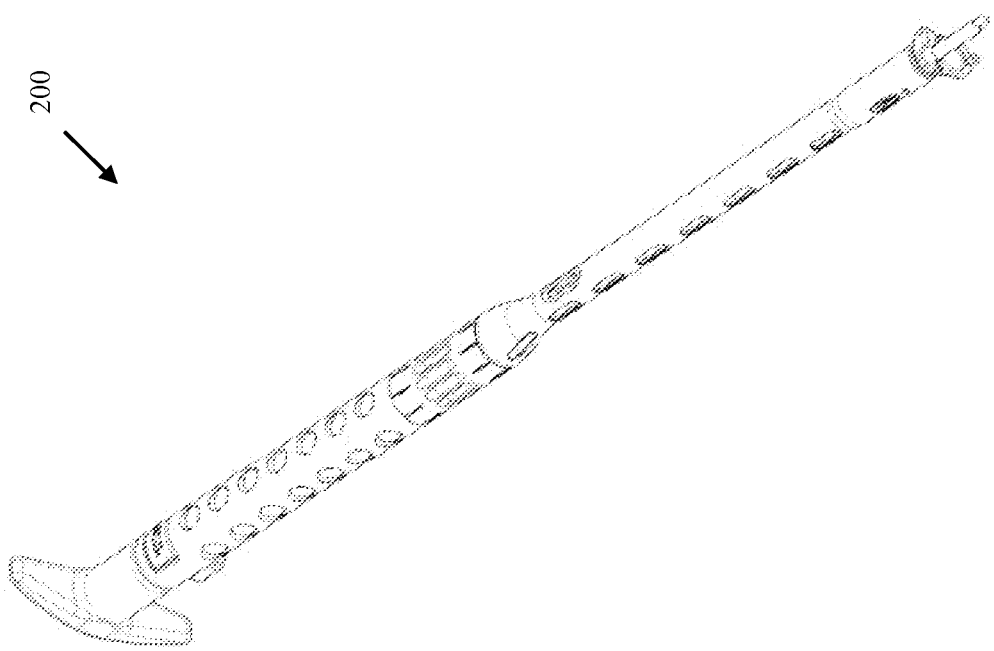
FIGS. 12A and 12B illustrate an assembled perspective view of another embodiment of an inserter instrument according to the present disclosure.
Figure 12A:
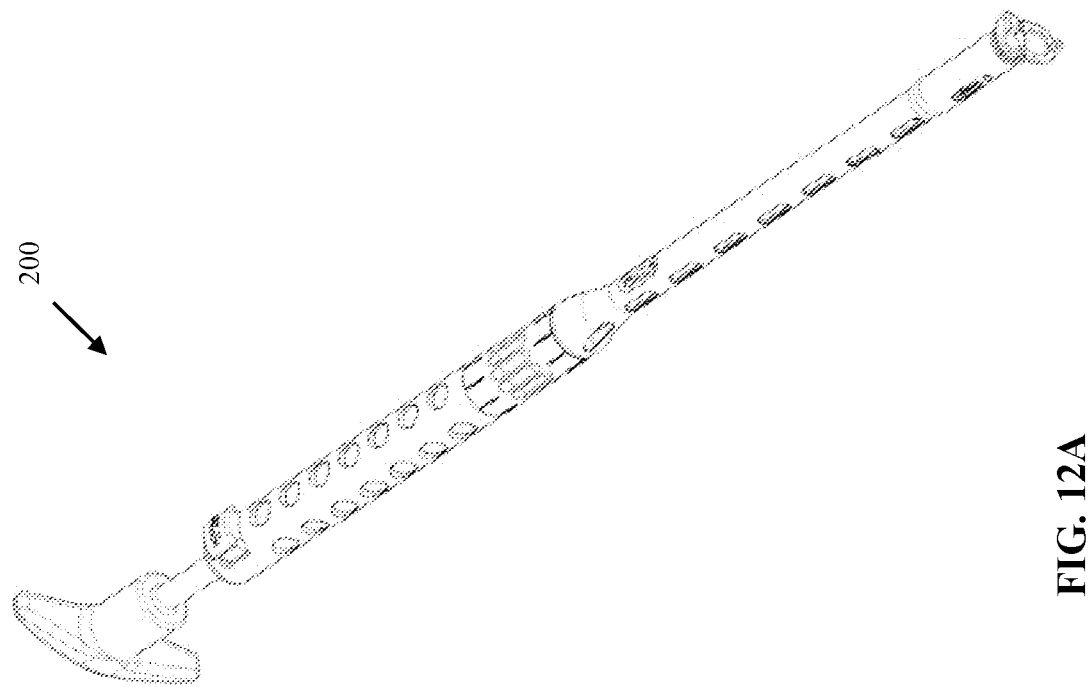
Figure 13:
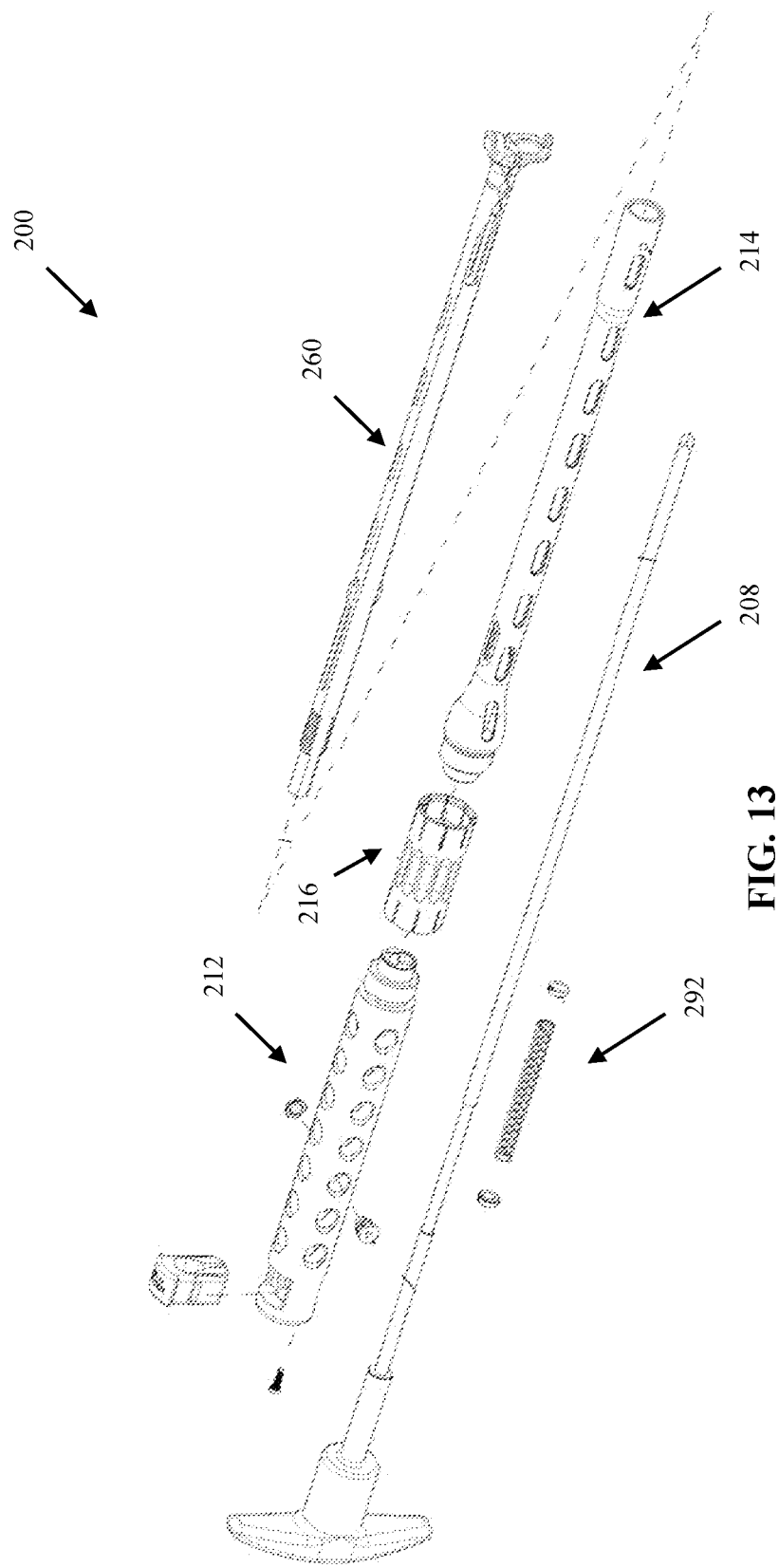
FIG. 13 illustrates an exploded perspective view of the inserter of FIG. 12.
Figure 14C:
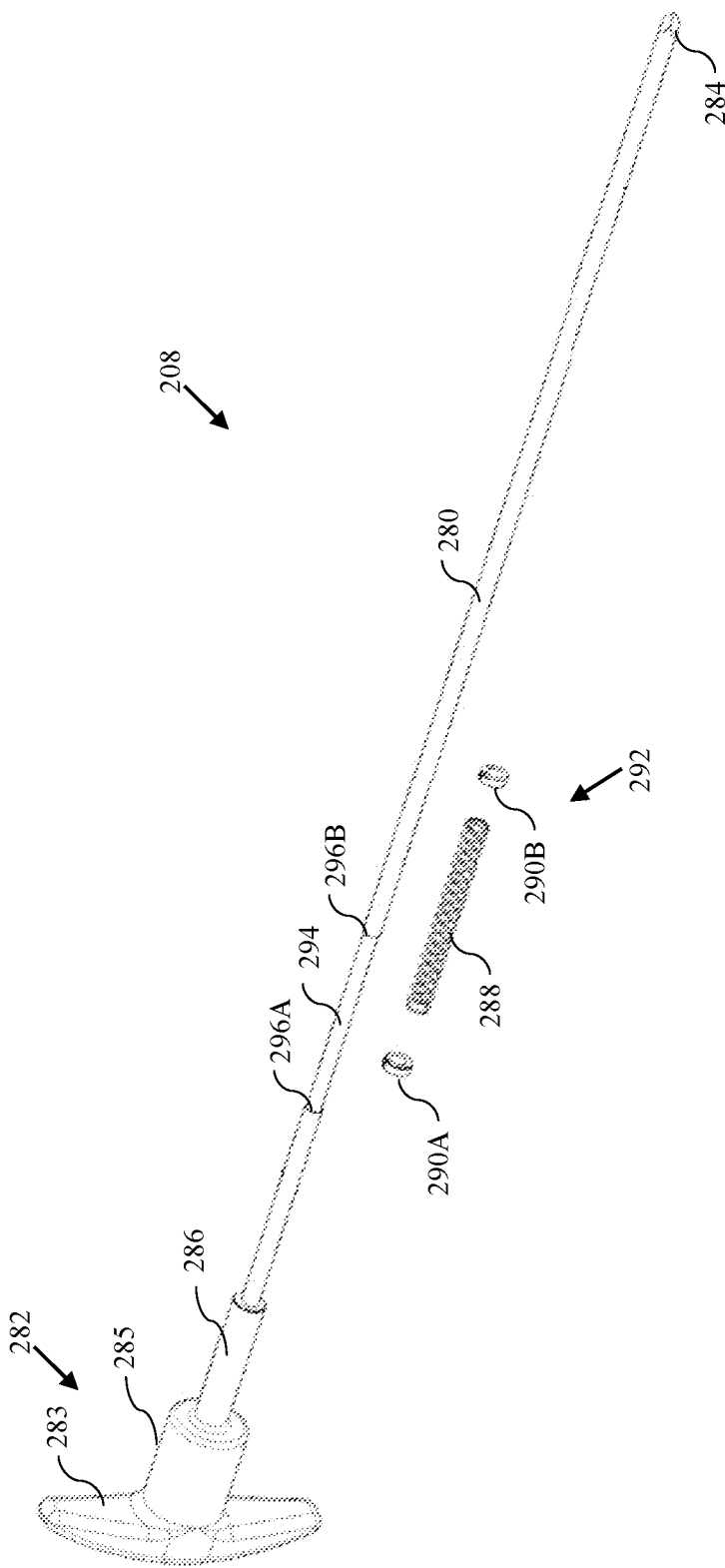
FIG. 14C illustrates an exploded perspective view of an awl of the inserter of FIG. 12.
Figure 15:
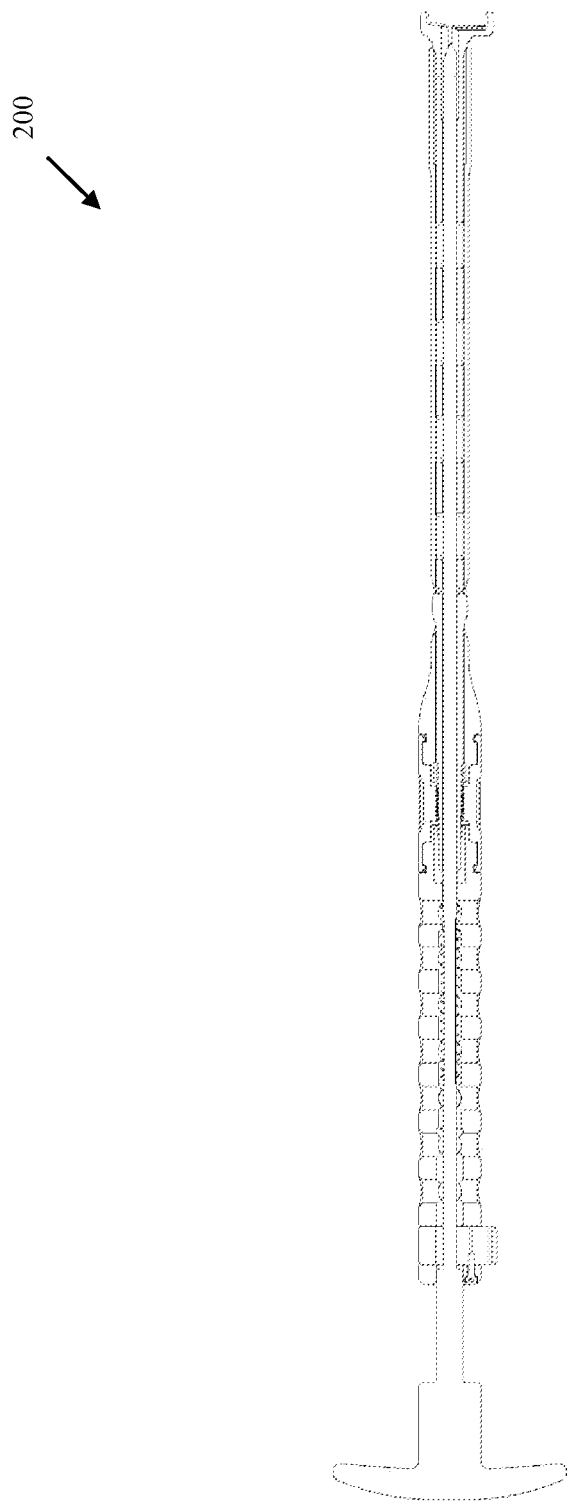
FIG. 15 illustrates a cross-sectional view of the inserter of FIG. 12.

FIGS. 12, 13, and 15 depict an alternative embodiment of an inserter 200. The inserter 200 is substantially similar to the inserter 100 as described herein, and like numbering represents like elements between the drawings. For example, in the embodiment of FIG. 1A through FIG. 11, 100-series reference numbers are used, while in the embodiment of FIGS. 12-13, 200-series reference numbers are used. Unless otherwise noted, like numbered elements such as, e.g., handle 112 (FIGS. 1A through 11) and handle 212 (FIGS. 12, 13, and 15), have similar structural and functional features. Inserter 200 may include an awl 208 including a T-shaped awl handle 282 (shown in detail in FIGS. 14B and 14C).

The awl handle 282 extends distally to meet a shoulder 286, from which the shaft 280 extends to an engagement tip 284 at a distal end thereof. The shaft 280 of the awl 208 may include a recessed portion 294 extending along a length thereof between a first end 296A and a second end 296B. As similarly discussed with reference to the inserter 100 (FIGS. 8A-8C), the recessed portion 294 may have a smaller diameter than a non-recessed portion of the shaft 280. The recessed portion 294 may be shaped and dimensioned to receive a spring assembly 292 thereon, such that a first snap ring 290A couples the first end of the spring 288 at the first end 296A and the second snap ring 290B couples the second end of the spring 288 at the second end 296B of the recessed portion 294. The spring 288 may compress in distal or proximal directions as the snap rings 290A, 290B translate within the recessed portion 294, as previously described herein.

Figure 16:
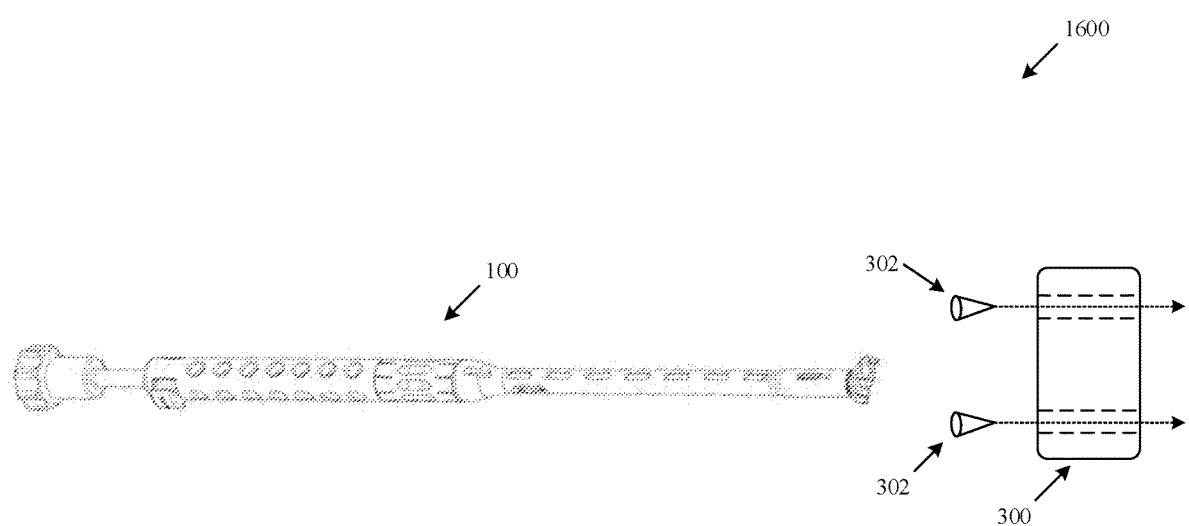
FIG. 16 illustrates a diagram of a system including the inserter of FIG. 1 according to the present disclosure.
Figure 17:
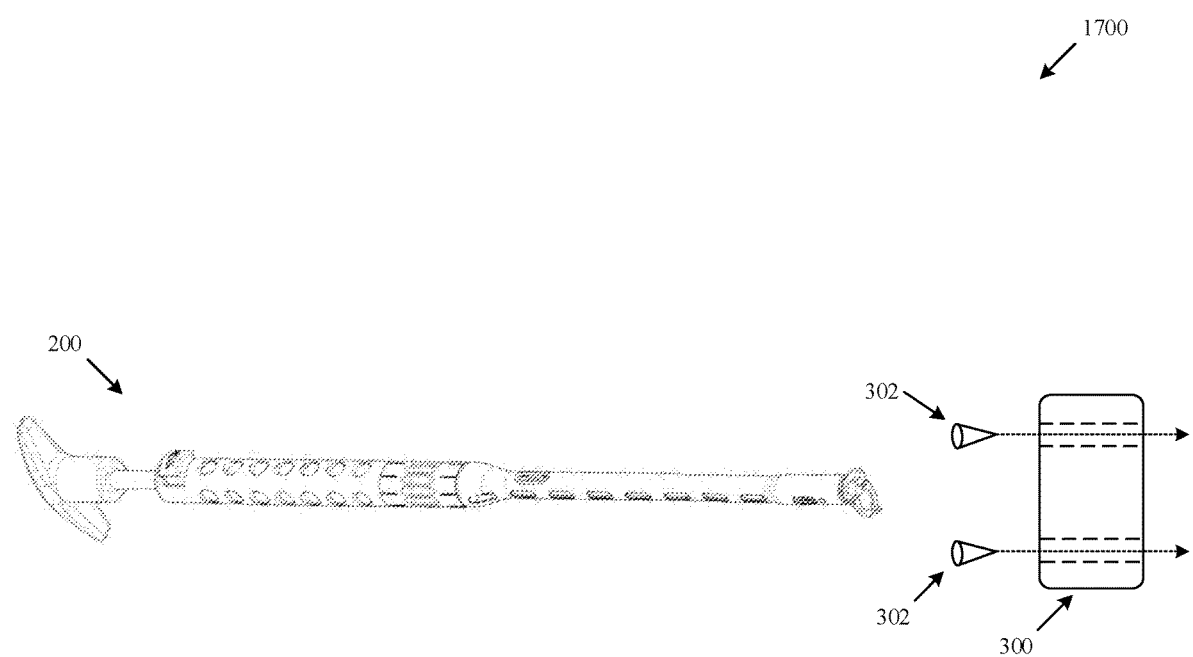
FIG. 17 illustrates a diagram of a system including the inserter of FIG. 12 according to the present disclosure.

Referring to FIGS. 16 and 17, in another embodiment, a system 1600 and a system 1700 are respectively provided for use in a spinal implant procedure. The systems 1600, 1700 may include an inserter 100 or 200 substantially as described herein (FIG. 16 and FIG. 17, respectively), together with a spinal plate 300 and at least one bone fastener 302 adapted to affix the spinal plate 300 to bone. Suitable spinal plates are known in the art. Without being limited to a particular spinal plate, exemplary spinal plates that can be used in connection with the inserter instruments described herein include: U.S. Pat. Nos. 7,963,981; 8,062,341; 8,236,034; 8,795,340; 8,876,866; 9,005,256; 9,095,387; 9,113,965; 9,326,802; 9,326,861; 9,364,272; 9,375,238; 9,427,330; 9,486,254; 9,592,082; 9,675,388; 9,681,898; 9,980,824; 9,987,057; 10,085,777; 10,213,235; 10,478,311; 10,512,550; 10,543,104; 10,682,165; 10,722,277; 10,925,752; 10,973,649; 11,065,128; 11,166,824; 11,399,875; 11,642,230; 11,672,571; and 11,684,486, the contents of which are incorporated by reference herein in their entirety for any and all purposes. Spinal plates used in conjunction with the present system may include a plurality of apertures, each aperture in the plurality of apertures being adapted to receive a fastener and to facilitate fixation to one or more vertebrae, for example, two vertebrae. For example, the present system may include a spinal plate having, e.g., two, three, four, five, six, seven, eight, or more fixation apertures, and a plurality of fasteners which may correspond to the number of fixation apertures present in the spinal plate. In some implementations, the system further includes a driver (not shown) configured to engage and drive a fastener, e.g., a bone screw, through a fixation aperture in a spinal plate, and into a pilot hole formed within a bone, e.g., a vertebra at a surgical site.

With reference to FIGS. 18-20, also provided herein are methods of assembling, disassembling, and using the inserters 100, 200 and systems as described herein.

With reference to FIG. 18, a method 1800 for assembling the inserters 100, 200 described herein may include one or more operations as described herein. For example, a first operation 1802 may include coupling a knob 116 between a handle 112 and an outer sleeve 114 of the housing 110 along the longitudinal axis 106. At operation 1804, release pin(s) 146A, 146B may be inserted through the aperture 148 disposed in the outer sleeve 114. At operation 1806, the inner sleeve 160 may slide into the lumen of the housing 110 through the opening 144 in the outer sleeve 114. At operation 1808, an external thread 174 disposed on the inner sleeve 160 may be threaded into engagement with an internal thread of the knob 116. At operation 1810, the keyed feature 172 at the proximal end 162 of the inner sleeve 160 may be inserted into engagement with the aperture 134 in the handle 112. At operation 1812, the lock screw 122 may be inserted through the handle 112 into engagement with the lock button 118 disposed within the aperture 120 of the handle 112. At operation 1814, the engagement tip 184 of the awl 108 may slide into the lumen of the housing 110 through the opening in the proximal end 124 of the handle 112. At operation 1816, the awl screw 130 may be inserted through the handle 112 into engagement with the awl 108. In various embodiments, one or more of the foregoing steps may be performed in a different order than the order in which the operations are described herein.

With reference to FIG. 19, a method 1900 for disassembling the inserters 100, 200 described herein may include one or more operations as described herein. For example, at operation 1902, the release button 176 disposed on the inner sleeve 160, and partially disposed in the aperture 150 in the outer sleeve 114, may be actuated. At operation 1904, the inner sleeve 160 may slide distally out of the lumen of the housing 110 through the opening 144 in the outer sleeve 114. At operation 1906, the awl screw 130 may be removed from the handle 112. At operation 1908, the lock button 118 partially disposed in the handle 112 may be actuated to disengage the awl 108. At operation 1910, the engagement tip 184 of the awl may slide proximally out of the lumen of the housing 110 through the opening in the proximal end 124 of the handle 112. At operation 1912, the knob 116 may be disengaged from the handle 112 and the outer sleeve 114. In various embodiments, one or more of the foregoing steps may be performed in a different order than the order in which the operations are described herein.

With reference to FIG. 20, a method 2000 for inserting a spinal plate using the inserters 100, 200 described herein may include one or more operations including, at operation 2002, providing a spinal plate 300, at least one bone fastener 302, and an inserter 100 configured to releasably engage the spinal plate. At operation 2004, the spinal plate 300 may be engaged by the distal tip of the inserter, e.g., by the distal engagement portion 166 of the inner sleeve 160. At operation 2006, the inserter 100 may be used to position the spinal plate 300 at a desired location for fixation to at least one vertebra. At operation 2008, the awl 108 may be used to form a pilot hole in the vertebra. At operation 2010, a bone fastener 302 may be inserted through a fixation aperture in the spinal plate 300 and into the pilot hole in the vertebra, thereby affixing the spinal plate 300 to the vertebra. Within a single implantation procedure, operations 2008 and 2010 may be performed iteratively as desired, to affix the spinal plate 300 to one or more vertebrae using a plurality of bone fasteners 302, e.g., two, three, four, five, six, seven, eight, or more bone fasteners. In certain embodiments, the spinal plate 300 may be affixed to two or more adjacent vertebrae. In such embodiments, one or more bone fasteners 302 may be inserted through a fixation aperture in the spinal plate 300 and into each of the plurality of vertebrae to which the spinal plate 300 is affixed. Furthermore, instruments having additional functionality may be deployed in furtherance of any of the foregoing steps, for example, a drill, tap, or driver may be used to aid in bone fastener fixation. In various embodiments, one or more of the foregoing steps may be performed in a different order than the order in which the operations are described herein.

The methods described herein and depicted in FIGS. 18-20 may be similarly applicable to the inserter 200 of FIGS. 12, 13, and 15.

EMBODIMENTS

Embodiments of the present disclosure may include the following features:

Item 1. An inserter for engaging and inserting a spinal plate, the inserter comprising: a housing extending along a longitudinal axis between a proximal end and a distal end of the inserter; an inner sleeve slidably disposed within the housing and configured to releasably engage the spinal plate at the distal end of the inserter; and an awl slidably disposed within the housing and configured to extend distally beyond the inner sleeve and to engage a cortical bone of a vertebra, thereby forming a pilot hole shaped and dimensioned to receive a bone fastener therein for affixing the spinal plate to the vertebra.

Item 2. The inserter of item 1, wherein the housing comprises a handle, an outer sleeve disposed distally relative to the handle, a knob fixedly coupled between the distal end of the handle and a proximal end of the outer sleeve, and a lumen extending through a length of the housing.

Item 3. The inserter of item 2, wherein the knob is configured to rotate about the longitudinal axis relative to the handle and the outer sleeve, thereby actuating translation of the inner sleeve within the lumen relative to the housing, and a transition of a distal engagement portion of the inner sleeve between a closed position and an open position for engaging or releasing the spinal plate, respectively.

Item 4. The inserter of item 3, wherein the distal engagement portion comprises a pair of engagement arms, and wherein rotation of the knob in a first direction corresponds to proximal translation of the inner sleeve into the closed position, and rotation of the knob in a second direction corresponds to distal translation of the inner sleeve into the open position.

Item 5. The inserter of item 4, further comprising a release pin partially disposed within the outer sleeve, wherein distal translation of the inner sleeve relative to the housing causes the release pin to engage a slot disposed between the pair of engagement arms, which in turn causes the pair of engagement arms to separate a pre-determined distance into the open position.

Item 6. The inserter of item 5, wherein proximal translation of the inner sleeve relative to the housing is configured to cause a tapered portion of the inner sleeve to contact the outer sleeve, which in turn causes the pair of engagement arms to close the pre-determined distance into the closed position.

Item 7. The inserter of item 5, wherein the inner sleeve comprises an outer surface having a substantially planar portion that is shaped and dimensioned to accommodate the release pin and to enable the inner sleeve to be slidably received within the outer sleeve.

Item 8. The inserter of item 5, wherein the inner sleeve comprises: a proximal engagement portion configured to engage the handle of the housing; and an external thread disposed between the proximal and distal engagement portions, wherein the external thread is configured to engage an internal thread of the knob of the housing.

Item 9. The inserter of item 8, wherein the proximal engagement portion comprises a keyed feature shaped and dimensioned to be received in a complementarily keyed aperture formed in a distal end of the handle.

Item 10. The inserter of item 2, further comprising a lock button partially disposed in the housing and axially translatable to transition between a locked position and an unlocked position.

Item 11. The inserter of item 10, wherein: in the locked position, the lock button is configured to engage the awl within the lumen, thereby restricting axial translation of the awl relative to the housing, and in the unlocked position, the lock button is configured to be disengaged from the awl within the lumen, thereby allowing axial translation of the awl relative to the housing.

Item 12. The inserter of item 10, wherein the lock button comprises a lock tab configured to engage a first groove of the handle in a locked position, and a second groove of the handle in an unlocked position, and wherein the lock button is configured to be actuated in a radially inward direction.

Item 13. The inserter of item 12, wherein the lock button comprises a biasing element disposed therein and configured to bias the lock button in a radially outward direction relative to the handle.

Item 14. The inserter of item 2, wherein the inner sleeve comprises a release button disposed thereon and configured to be received in an aperture of the outer sleeve, wherein the release button is movable in a radial direction relative to the longitudinal axis to disassemble the inserter.

Item 15. The inserter of item 2, wherein the awl comprises an awl handle at a proximal end thereof, a shaft extending distally from the awl handle, and an engagement tip at a distal end of the shaft.

Item 16. The inserter of item 15, wherein the awl handle is configured to drive translation of the engagement tip distally or proximally relative to the housing, and to drive rotation of the engagement tip relative to the housing.

Item 17. The inserter of item 15, further comprising: an awl spring disposed around a portion of the shaft of the awl, wherein translation of the awl in a distal or proximal direction relative to the housing causes the awl spring to compress or expand, respectively.

Item 18. The inserter of item 15, further comprising an awl screw at least partially disposed within the handle, wherein the awl screw is shaped and dimensioned to engage and retain the awl within the housing, and to limit proximal translation of the awl relative to the handle.

Item 19. A system comprising: a spinal plate having an aperture configured to receive a bone fastener; an inserter configured to releasably engage the spinal plate, wherein the inserter comprises: a housing extending along a longitudinal axis between a proximal end and a distal end of the inserter; an inner sleeve slidably disposed within the housing and having a distal tip configured to releasably engage the spinal plate; and an awl slidably disposed within the housing and configured to extend distally beyond the inner sleeve to engage a cortical bone of a vertebra, and to form a pilot hole in the vertebra that is shaped and dimensioned to receive the bone fastener therein; and the bone fastener, configured for insertion through the aperture and into the pilot hole to affix the spinal plate to the vertebra.

Item 20. A method for inserting a spinal plate comprising: providing the spinal plate and an inserter configured to releasably engage the spinal plate, wherein the inserter comprises a housing extending along a longitudinal axis between a proximal end and a distal end of the inserter, an inner sleeve slidably disposed within the housing, and an awl slidably disposed within the housing; engaging the spinal plate with a distal tip of the inner sleeve; using the inserter, positioning the spinal plate along a vertebra; using the awl, forming a pilot hole in the vertebra; and inserting a bone fastener through an aperture in the spinal plate and the pilot hole in the vertebra, thereby affixing the spinal plate to the vertebra.

Item 21. A system comprising: a spinal plate having an aperture configured to receive a bone fastener; an inserter configured to releasably engage the spinal plate, wherein the inserter comprises: a housing extending along a longitudinal axis between a proximal end and a distal end of the inserter; an inner sleeve slidably disposed within the housing and having a distal tip configured to releasably engage the spinal plate; and an awl slidably disposed within the housing and configured to extend distally beyond the inner sleeve to engage a cortical bone of a vertebra, and to form a pilot hole in the vertebra that is shaped and dimensioned to receive the bone fastener therein; and the bone fastener, configured for insertion through the aperture and into the pilot hole to affix the spinal plate to the vertebra.

Item 22. The system of item 21, wherein the housing comprises a handle, an outer sleeve disposed distally relative to the handle, a knob fixedly coupled between the distal end of the handle and a proximal end of the outer sleeve, and a lumen extending through a length of the housing.

Item 23. The system of item 22, wherein the knob is configured to rotate about the longitudinal axis relative to the handle and the outer sleeve, thereby actuating translation of the inner sleeve within the lumen relative to the housing, and a transition of a distal engagement portion of the inner sleeve between a closed position and an open position for engaging or releasing the spinal plate, respectively.

Item 24. The system of item 23, wherein the distal engagement portion comprises a pair of engagement arms, and wherein rotation of the knob in a first direction corresponds to proximal translation of the inner sleeve into the closed position, and rotation of the knob in a second direction corresponds to distal translation of the inner sleeve into the open position.

Item 25. The system of item 24, wherein the inserter further comprises a release pin partially disposed within the outer sleeve, wherein distal translation of the inner sleeve relative to the housing causes the release pin to engage a slot disposed between the pair of engagement arms, which in turn causes the pair of engagement arms to separate a pre-determined distance into the open position.

Item 26. The system of item 25, wherein proximal translation of the inner sleeve relative to the housing is configured to cause a tapered portion of the inner sleeve to contact the outer sleeve, which in turn causes the pair of engagement arms to close the pre-determined distance into the closed position.

Item 27. The system of item 25, wherein the inner sleeve comprises an outer surface having a substantially planar portion that is shaped and dimensioned to accommodate the release pin and to enable the inner sleeve to be slidably received within the outer sleeve.

Item 28. The system of item 25, wherein the inner sleeve comprises: a proximal engagement portion configured to engage the handle of the housing; and an external thread disposed between the proximal and distal engagement portions, wherein the external thread is configured to engage an internal thread of the knob of the housing.

Item 29. The system of item 28, wherein the proximal engagement portion comprises a keyed feature shaped and dimensioned to be received in a complementarily keyed aperture formed in a distal end of the handle.

Item 30. The system of item 22, wherein the inserter further comprises a lock button partially disposed in the housing and axially translatable to transition between a locked position and an unlocked position.

Item 31. The system of item 30, wherein: in the locked position, the lock button is configured to engage the awl within the lumen, thereby restricting axial translation of the awl relative to the housing, and in the unlocked position, the lock button is configured to be disengaged from the awl within the lumen, thereby allowing axial translation of the awl relative to the housing.

Item 32. The system of item 30, wherein the lock button comprises a lock tab configured to engage a first groove of the handle in a locked position, and a second groove of the handle in an unlocked position, and wherein the lock button is configured to be actuated in a radially inward direction.

Item 33. The system of item 32, wherein the lock button comprises a biasing element disposed therein and configured to bias the lock button in a radially outward direction relative to the handle.

Item 34. The system of item 22, wherein the inner sleeve comprises a release button disposed thereon and configured to be received in an aperture of the outer sleeve, wherein the release button is movable in a radial direction relative to the longitudinal axis to disassemble the inserter.

Item 35. The system of item 22, wherein the awl comprises an awl handle at a proximal end thereof, a shaft extending distally from the awl handle, and an engagement tip at a distal end of the shaft.

Item 36. The system of item 35, wherein the awl handle is configured to drive translation of the engagement tip distally or proximally relative to the housing, and to drive rotation of the engagement tip relative to the housing.

Item 37. The system of item 35, wherein the inserter further comprises: an awl spring disposed around a portion of the shaft of the awl, wherein translation of the awl in a distal or proximal direction relative to the housing causes the awl spring to compress or expand, respectively.

Item 38. The system of item 35, wherein the inserter further comprises: an awl screw at least partially disposed within the handle, wherein the awl screw is shaped and dimensioned to engage and retain the awl within the housing, and to limit proximal translation of the awl relative to the handle.

Item 39. The system of item 31, further comprising a driver configured to engage and insert the bone fastener through the aperture and into the pilot hole to affix the spinal plate to the vertebra.

Item 40. The system of item 31, further comprising: a drill configured to engage the pilot hole and to form an internal thread therein, wherein the bone fastener comprises a bone screw having an external thread configured to engage the internal thread of the pilot hole.

Item 41. A method for inserting a spinal plate comprising: providing the spinal plate and an inserter configured to releasably engage the spinal plate, wherein the inserter comprises a housing extending along a longitudinal axis between a proximal end and a distal end of the inserter, an inner sleeve slidably disposed within the housing, and an awl slidably disposed within the housing; engaging the spinal plate with a distal tip of the inner sleeve; using the inserter, positioning the spinal plate along a vertebra; using the awl, forming a pilot hole in the vertebra; and inserting a bone fastener through an aperture in the spinal plate and the pilot hole in the vertebra, thereby affixing the spinal plate to the vertebra.

Item 42. The method of item 41, wherein engaging the spinal plate comprises: receiving a portion of the spinal plate within a distal engagement portion of the inner sleeve, wherein the distal engagement portion comprises a pair of engagement arms shaped and dimensioned to releasably engage the spinal plate; and actuating the distal engagement portion to transition from an open position to a closed position to engage the spinal plate; wherein the housing comprises: a handle, an outer sleeve disposed distally relative to the handle, a knob fixedly coupled between a distal end of the handle and a proximal end of the outer sleeve, and a lumen extending through a length of the housing, and wherein the knob is configured to rotate about the longitudinal axis relative to the handle and the outer sleeve in a first direction which corresponds to proximal translation of the inner sleeve into the closed position, and in a second direction which corresponds to distal translation of the inner sleeve into the open position.

Item 43. The method of item 42, further comprising: actuating the distal engagement portion into the open position by rotating the knob in the second direction, thereby distally translating the inner sleeve relative to the housing and into contact with a release pin partially disposed within the outer sleeve, wherein the release pin is shaped and dimensioned to engage a slot disposed between the pair of engagement arms, and separating the pair of engagement arms by a pre-determined distance into the open position.

Item 44. The method of item 43, wherein actuating the distal engagement portion into the open position further comprises, proximally translating the inner sleeve relative to the housing, thereby driving a tapered portion of the inner sleeve into contact with the outer sleeve, and in turn causing the pair of engagement arms to close the pre-determined distance into the closed position.

Item 45. The method of item 42, wherein forming the pilot hole comprises: actuating a lock button partially disposed in the housing of the inserter into an unlocked position, wherein the lock button is movable in a radial direction relative to the longitudinal axis to transition between a locked position and the unlocked position; and using an awl handle, distally translating an engagement tip of the awl through the housing and into engagement with the vertebra to form the pilot hole.

Item 46. The method of item 45, further comprising: actuating the lock button into the locked position; proximally pulling the awl handle to disengage the engagement tip from the vertebra, wherein the awl comprises an awl spring disposed around a portion of the shaft, wherein translation of the awl distally or proximally relative to the housing causes the awl spring to compress, which in turn causes a decrease in translation speed of the engagement tip relative to the housing.

Item 47. The method of item 42, further comprising assembling the inserter.

Item 48. The method of item 47, wherein assembling the inserter comprises: coupling the handle to the knob, and the knob to the outer sleeve of the housing; sliding the inner sleeve into the lumen of the housing through an opening in the outer sleeve at the distal end of the inserter; and sliding an engagement tip of the awl into the lumen of the housing through an opening in the handle at the proximal end of the inserter.

Item 49. The method of item 48, wherein assembling the inserter further comprises: threading an external thread disposed on the inner sleeve into threaded engagement with an internal thread of the knob; and inserting a proximal engagement portion of the inner sleeve into engagement with a keyed aperture formed in a distal end of the handle.

Item 50. The method of item 49, further comprising disassembling the inserter.

Item 51. The method of item 50, wherein disassembling the inserter comprises: actuating a release button disposed on the inner sleeve and partially disposed in an aperture formed in the outer sleeve, wherein the release button is movable in a radial direction relative to the longitudinal axis which causes a portion of the inner sleeve to displace in a radially inward direction relative to the housing, and which in turn causes the inner sleeve to disengage the housing and be slidably removed from the outer sleeve through the distal end.

Item 52. The inserter of item 4, wherein the release pin comprises a pair of release pins partially disposed within the outer sleeve.

Item 53. The inserter of item 53, wherein the pair of release pins are disposed partially within the lumen such that an engagement tip of the awl may distally translate between respective ends of the pair of release pins.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The terminology used herein is for the purpose of describing particular embodiments only and is not intended to be limiting of the disclosure. As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups. As used herein, "substantially" refers to largely, for the most part, entirely specified or any slight deviation which provides the same technical benefits of the disclosure.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. An inserter for engaging and inserting a spinal plate, the inserter comprising:
    a housing extending along a longitudinal axis between a proximal end and a distal end of the inserter and comprising a handle, an outer sleeve disposed distally relative to the handle, a knob fixedly coupled between a distal end of the handle and a proximal end of the outer sleeve, and a lumen extending through a length of the housing;
    an inner sleeve slidably disposed within the housing and configured to releasably engage the spinal plate at the distal end of the inserter; and
    an awl slidably disposed within the housing and configured to extend distally beyond the inner sleeve and to engage a cortical bone of a vertebra, thereby forming a pilot hole shaped and dimensioned to receive a bone fastener therein for affixing the spinal plate to the vertebra.

2. The inserter of claim 1, wherein the knob is configured to rotate about the longitudinal axis relative to the handle and the outer sleeve, thereby actuating translation of the inner sleeve within the lumen relative to the housing, and a transition of a distal engagement portion of the inner sleeve between a closed position and an open position for engaging or releasing the spinal plate, respectively.

3. The inserter of claim 2, wherein the distal engagement portion comprises a pair of engagement arms, and wherein rotation of the knob in a first direction corresponds to proximal translation of the inner sleeve into the closed position, and rotation of the knob in a second direction corresponds to distal translation of the inner sleeve into the open position.

4. The inserter of claim 3, further comprising a release pin partially disposed within the outer sleeve,
    wherein distal translation of the inner sleeve relative to the housing causes the release pin to engage a slot disposed between the pair of engagement arms, which in turn causes the pair of engagement arms to separate a pre-determined distance into the open position.

5. The inserter of claim 4, wherein proximal translation of the inner sleeve relative to the housing is configured to cause a tapered portion of the inner sleeve to contact the outer sleeve, which in turn causes the pair of engagement arms to close the pre-determined distance into the closed position.

6. The inserter of claim 4, wherein the inner sleeve comprises an outer surface having a substantially planar portion that is shaped and dimensioned to accommodate the release pin and to enable the inner sleeve to be slidably received within the outer sleeve.

7. The inserter of claim 4, wherein the inner sleeve comprises:
    a proximal engagement portion configured to engage the handle of the housing; and
    an external thread disposed between the proximal and distal engagement portions, wherein the external thread is configured to engage an internal thread of the knob of the housing.

8. The inserter of claim 7, wherein the proximal engagement portion comprises a keyed feature shaped and dimensioned to be received in a complementarily keyed aperture formed in a distal end of the handle.

9. The inserter of claim 1, further comprising a lock button partially disposed in the housing and axially translatable to transition between a locked position and an unlocked position.

10. The inserter of claim 9, wherein:
    in the locked position, the lock button is configured to engage the awl within the lumen, thereby restricting axial translation of the awl relative to the housing, and
    in the unlocked position, the lock button is configured to be disengaged from the awl within the lumen, thereby allowing axial translation of the awl relative to the housing.

11. The inserter of claim 9, wherein the lock button comprises a lock tab configured to engage a first groove of the handle in a locked position, and a second groove of the handle in an unlocked position, and wherein the lock button is configured to be actuated in a radially inward direction.

12. The inserter of claim 11, wherein the lock button comprises a biasing element disposed therein and configured to bias the lock button in a radially outward direction relative to the handle.

13. The inserter of claim 1, wherein the inner sleeve comprises a release button disposed thereon and configured to be received in an aperture of the outer sleeve, wherein the release button is movable in a radial direction relative to the longitudinal axis to disassemble the inserter.

14. The inserter of claim 1, wherein the awl comprises an awl handle at a proximal end thereof, a shaft extending distally from the awl handle, and an engagement tip at a distal end of the shaft.

15. The inserter of claim 14, wherein the awl handle is configured to drive translation of the engagement tip distally or proximally relative to the housing, and to drive rotation of the engagement tip relative to the housing.

16. The inserter of claim 14, further comprising:
    an awl spring disposed around a portion of the shaft of the awl,
    wherein translation of the awl in a distal or proximal direction relative to the housing causes the awl spring to compress or expand, respectively.

17. The inserter of claim 14, further comprising an awl screw at least partially disposed within the handle, wherein the awl screw is shaped and dimensioned to engage and retain the awl within the housing, and to limit proximal translation of the awl relative to the handle.

18. A system comprising:
    a spinal plate having an aperture configured to receive a bone fastener;
    an inserter configured to releasably engage the spinal plate, wherein the inserter comprises:
        a housing extending along a longitudinal axis between a proximal end and a distal end of the inserter and comprising a handle, an outer sleeve disposed distally relative to the handle, a knob fixedly coupled between a distal end of the handle and a proximal end of the outer sleeve, and a lumen extending through a length of the housing;

an inner sleeve slidably disposed within the housing and having a distal tip configured to releasably engage the spinal plate; and an awl slidably disposed within the housing and configured to extend distally beyond the inner sleeve to engage a cortical bone of a vertebra, and to form a pilot hole in the vertebra that is shaped and dimensioned to receive the bone fastener therein; and the bone fastener, configured for insertion through the aperture and into the pilot hole to affix the spinal plate to the vertebra.

19. A method for inserting a spinal plate comprising:

providing the spinal plate and an inserter configured to releasably engage the spinal plate, wherein the inserter comprises: a housing extending along a longitudinal axis between a proximal end and a distal end of the inserter, an inner sleeve slidably disposed within the housing, and an awl slidably disposed within the housing;

engaging the spinal plate with a distal tip of the inner sleeve;

using the inserter, positioning the spinal plate along a vertebra;

using the awl, forming a pilot hole in the vertebra; and inserting a bone fastener through an aperture in the spinal plate and the pilot hole in the vertebra, thereby affixing the spinal plate to the vertebra.

\* \* \* \* \*